United States Patent [19]

Awamura

[11] Patent Number: 4,736,110
[45] Date of Patent: Apr. 5, 1988

[54] IMAGE PICK-UP APPARATUS

[75] Inventor: Daikichi Awamura, Kawasaki, Japan

[73] Assignee: Nippon Jidoseigyo, Ltd., Yokohama, Japan

[21] Appl. No.: 777,342

[22] Filed: Sep. 18, 1985

[30] Foreign Application Priority Data

| Sep. 28, 1984 | [JP] | Japan | 59-202019 |
| Nov. 15, 1984 | [JP] | Japan | 59-240927 |
| Nov. 19, 1984 | [JP] | Japan | 59-242419 |
| Apr. 12, 1985 | [JP] | Japan | 60-76611 |
| Jul. 2, 1985 | [JP] | Japan | 60-143849 |
| Jul. 5, 1985 | [JP] | Japan | 60-146710 |
| Jul. 8, 1985 | [JP] | Japan | 60-148158 |
| Jul. 11, 1985 | [JP] | Japan | 60-151221 |
| Jul. 17, 1985 | [JP] | Japan | 60-156063 |

[51] Int. Cl.⁴ .............................................. H01J 40/14
[52] U.S. Cl. .................................... 250/578; 358/293; 350/6.6
[58] Field of Search .............. 250/578, 234, 235, 236; 358/293, 294, 212, 213; 350/6.5, 6.6

[56] References Cited

U.S. PATENT DOCUMENTS 4,241,257 12/1980 Koester .............................. 250/235
4,566,788 1/1986 Buczek ............................ 250/578 X Primary Examiner—Eugene R. LaRoche
Assistant Examiner—Robert J. Pascal
Attorney, Agent, or Firm—Stevens, Davis, Miller & Mosher

[57] ABSTRACT

An image pick-up apparatus including a laser light source for emitting a laser beam, an acoustic-optical element for deflecting the laser beam in a main-scanning direction at a horizontal scanning frequency, a vibrating mirror for deflecting the laser beam deflected in the main-scanning direction in a sub-scanning direction perpendicular to the main-scanning direction at a vertical scanning frequency, an objective lens for projecting the laser beam deflected two-dimensionally onto a specimen as a fine spot, collecting a light flux reflected by the specimen, and directing the collected light flux onto the vibrating mirror, and a linear image sensor for receiving the light beam reflected by the vibrating mirror and having a number of photoelectric converting elements aligned linearly in the main-scanning direction. The linear image sensor is readout at the horizontal scanning frequency to derive an image signal.

82 Claims, 27 Drawing Sheets

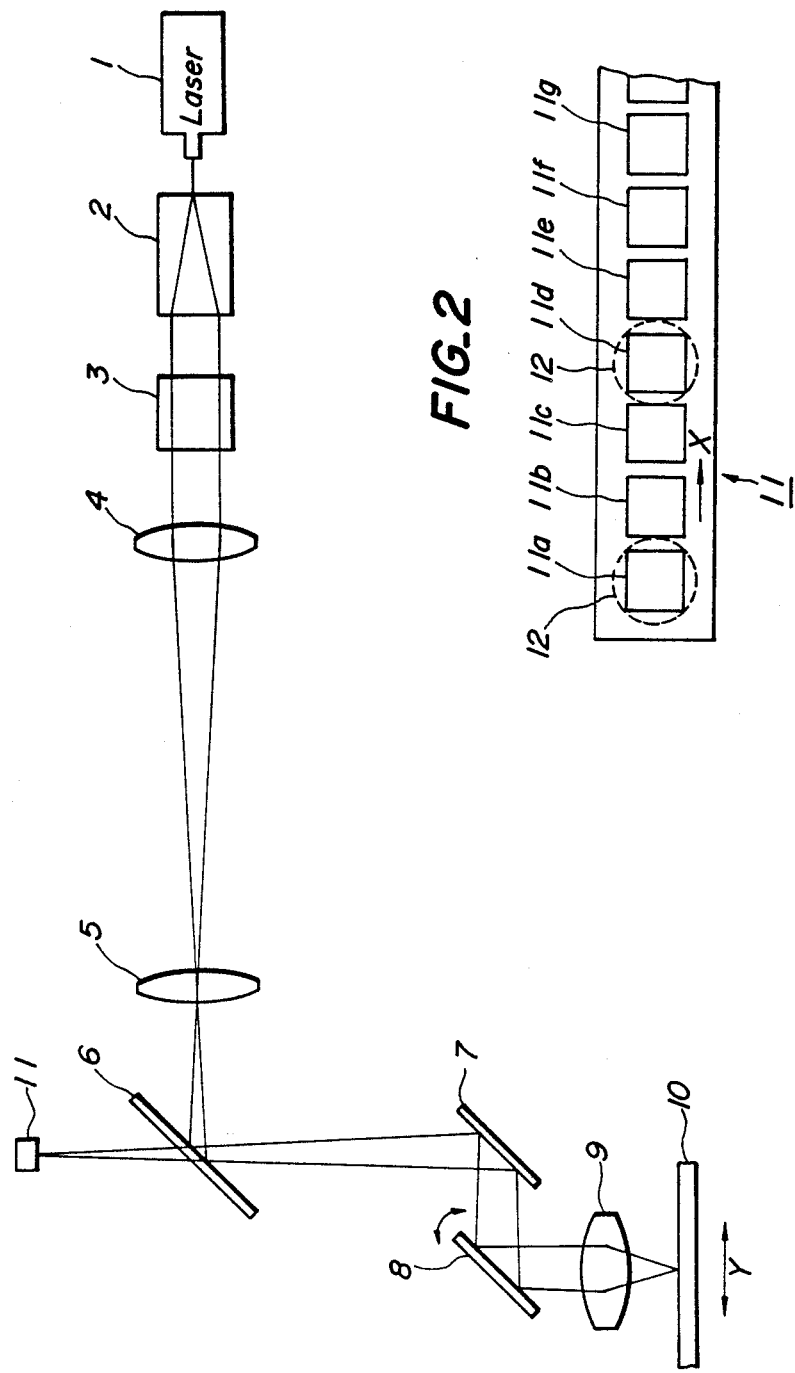

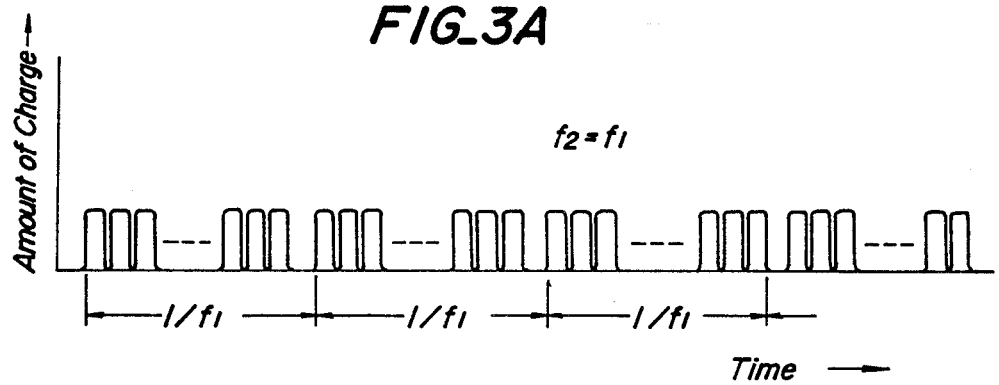
FIG_3A
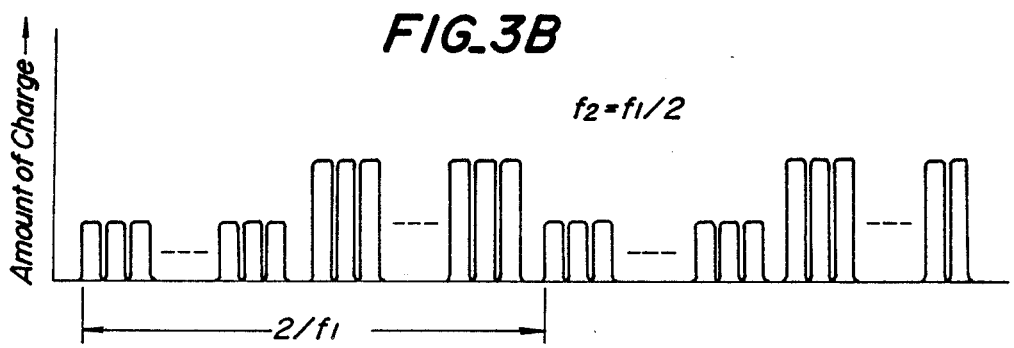
FIG_3B
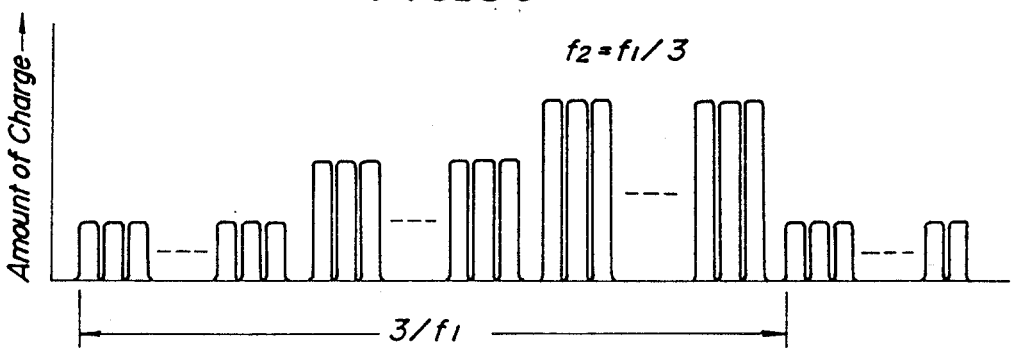
FIG_3C

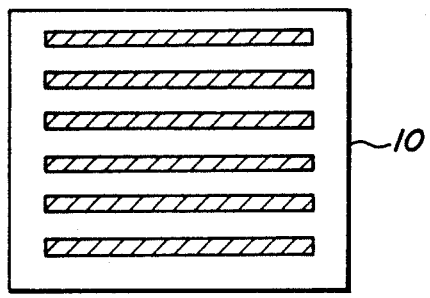
FIG_4A
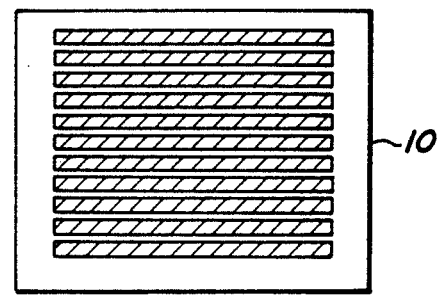
FIG_4B
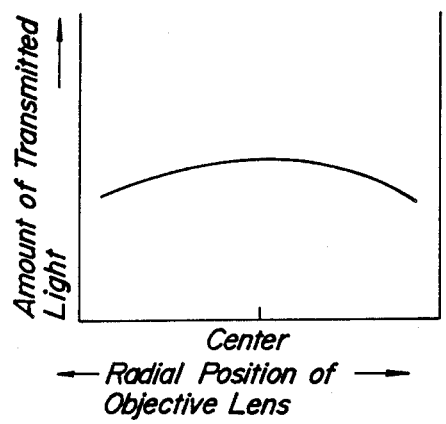
FIG_5

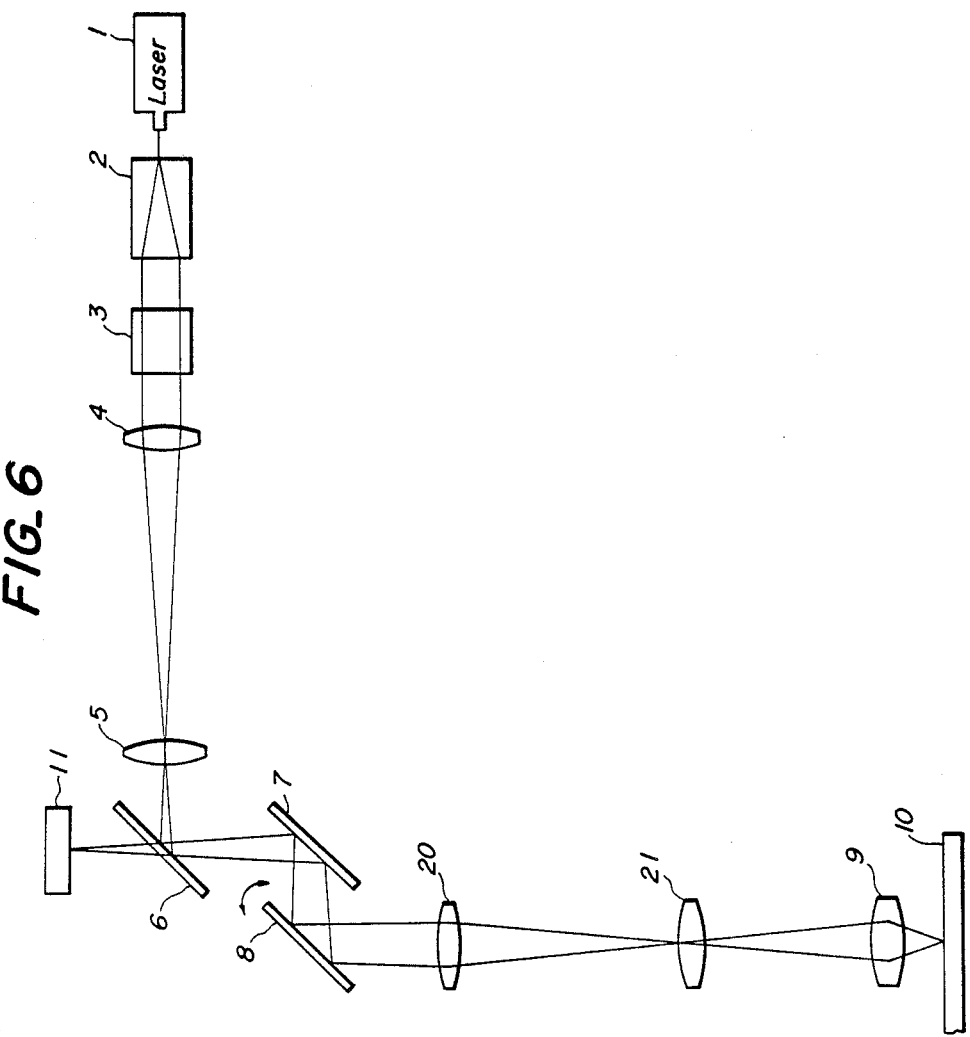

FIG_8A
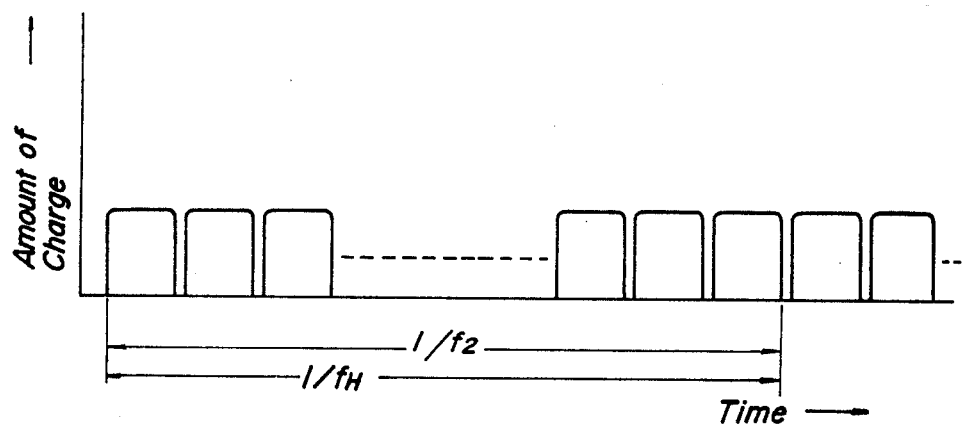
FIG_8B
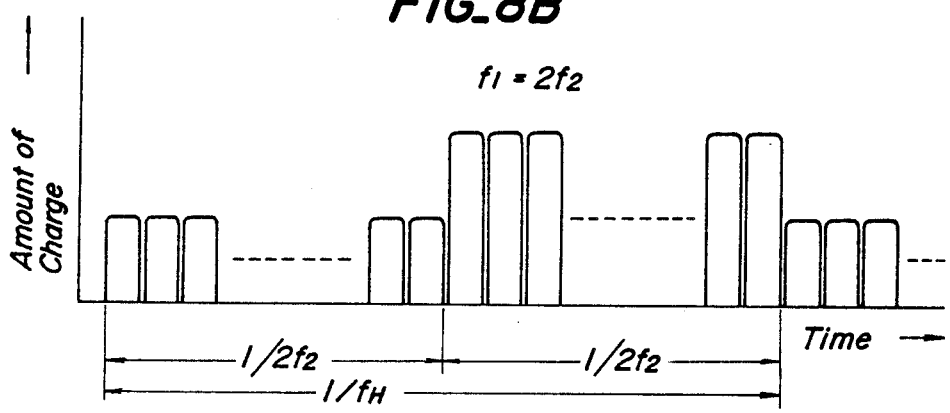
FIG_8C
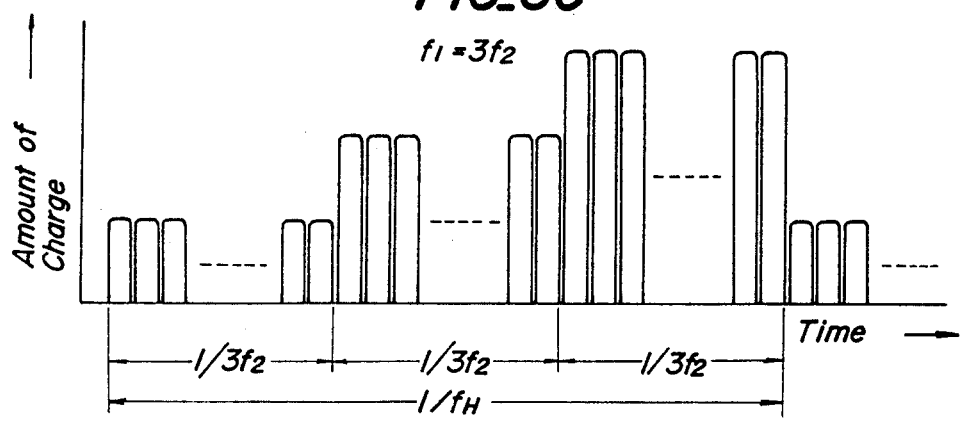

FIG_10

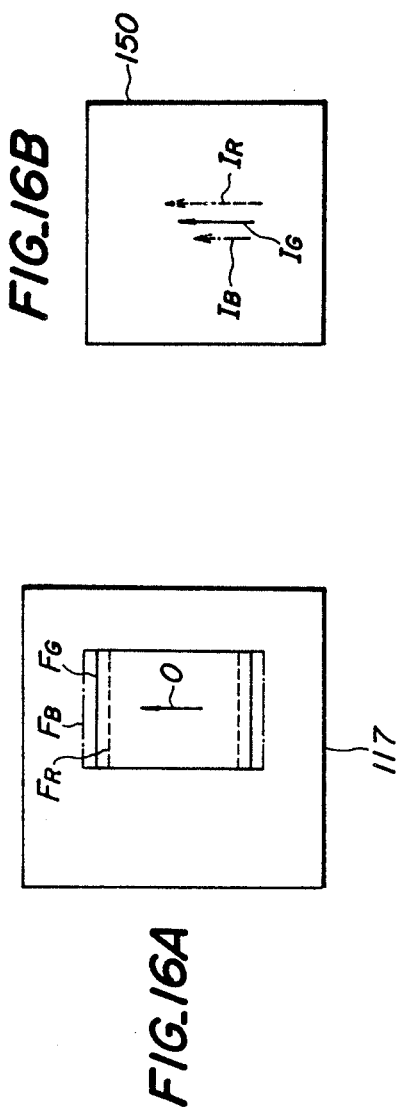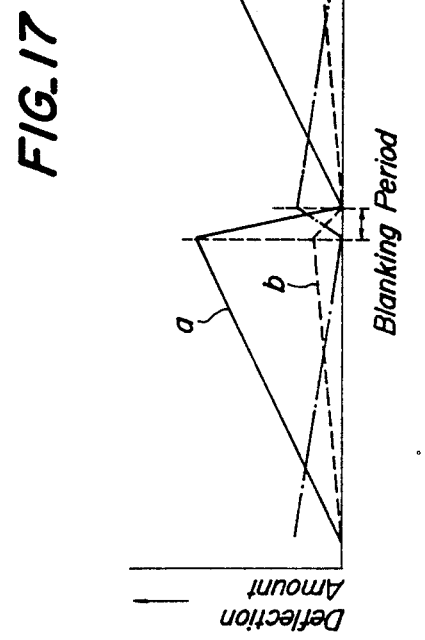

FIG_20A
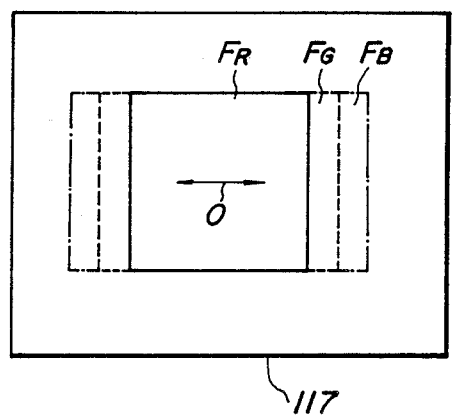
FIG_20B
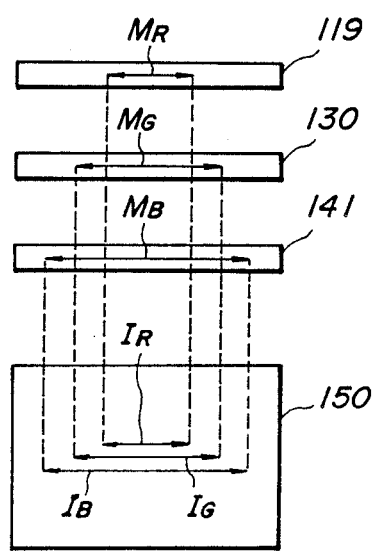

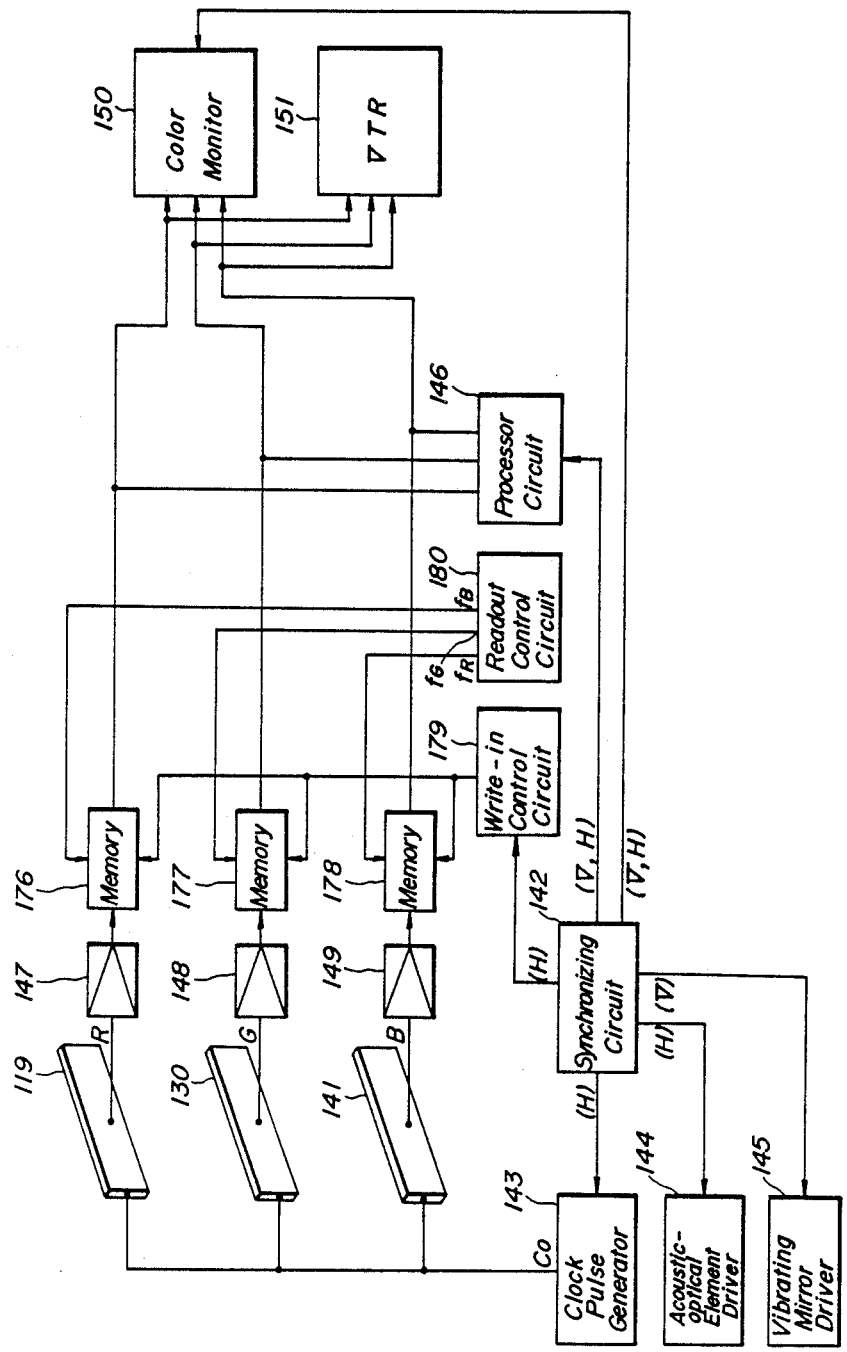

FIG_22A 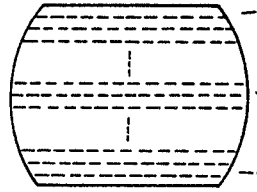 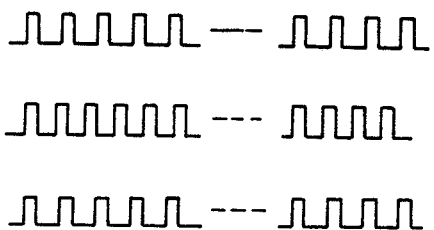 FIG_22B
FIG_22C 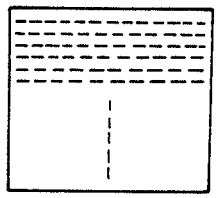

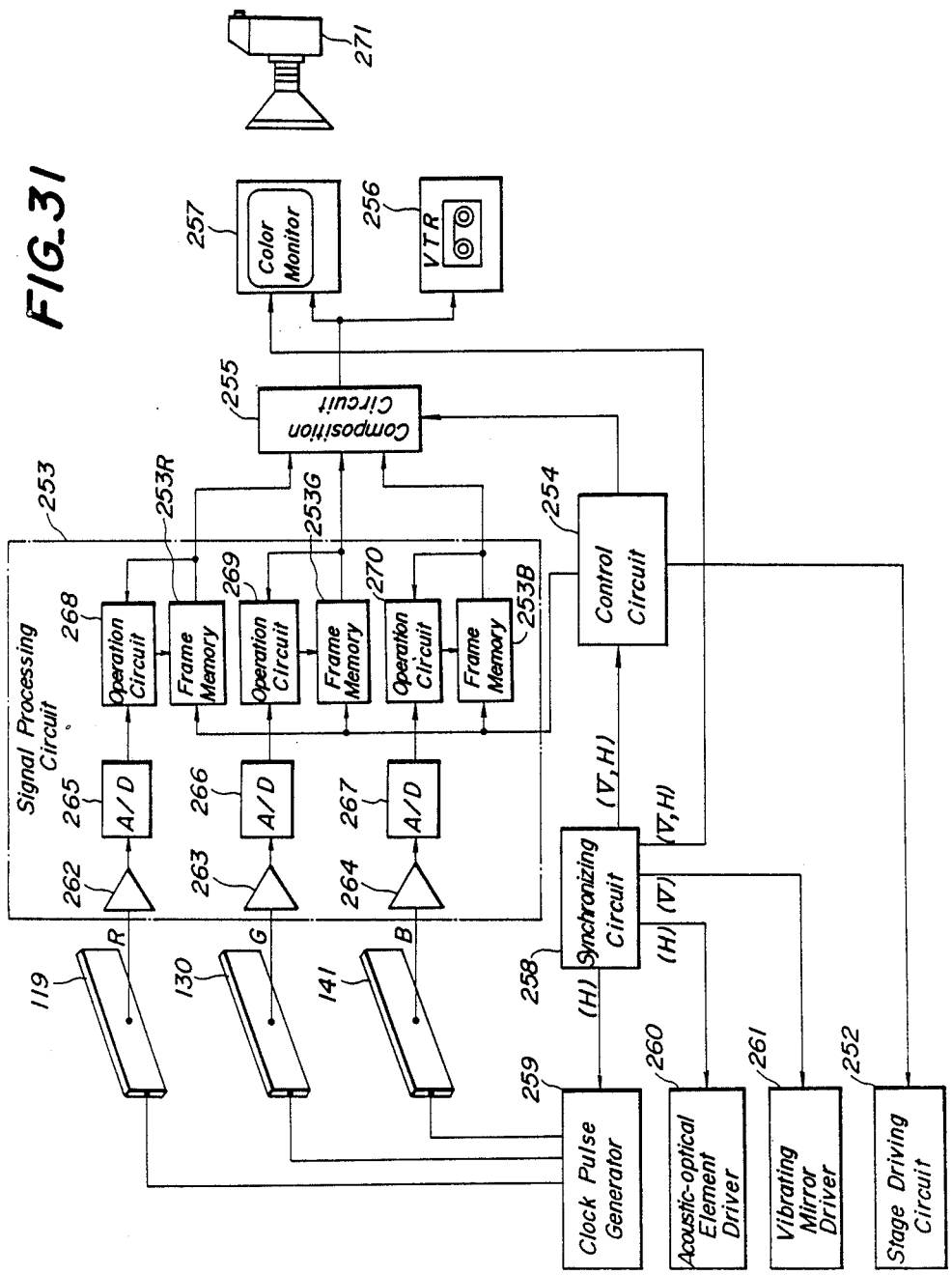

IMAGE PICK-UP APPARATUS

BACKGROUND OF THE INVENTION

1. Field of the Invention

The present invention relates to an image pick-up apparatus having high S/N and small image distortion.

2. Related Art Statement

Heretofore, there has been practiced an optical scanning type microscopic image pick-up apparatus in which a light beam is deflected two dimensionally by means of two deflectors to scan a specimen at a high speed with a fine spot, and a light flux reflected by the specimen is transmitted through the two deflectors in the opposite direction and is made incident upon a light receiving element such as a photomultiplier tube to generate an electric signal representing optical information of the specimen. Such an image pick-up apparatus has several advantages that any stray light can be prevented due to the fact that the specimen scanned by the beam spot, an image displayed on a monitor can be inspected, and that brightness and contrast of the displayed image can be electrically adjusted in an easy and precise manner. Therefore, such an image pick-up apparatus can be advantageously utilized in various applications.

As an image sensor there has been also developed a two dimensional solid state image sensor. Usually, the two dimensional solid state image sensor has been used instead of an image pick-up tube onto which an image of a uniformly illuminated specimen is projected by means of an objective lens.

In the known optically scanning microscopic type image pick-up apparatus, since the specimen is scanned by a light beam at a high speed, it is necessary to use the photomultiplier tube having high sensitivity, and therefore the apparatus is liable to be large in size and expensive in cost. Further, it is very difficult to deflect the light beam two-dimensionally at a constant speed to scan the specimen. If the scanning speed fluctuates, there might occur an image distortion and therefore the image of specimen would not be reproduced accurately. Further, since the two dimensional solid state image sensor has a low sensitivity, it is necessary to use a light source emitting high intensity light. Then, the apparatus comprising the solid state image sensor is also liable to be large in size. Moreover, since the definition or resolving power of two dimensional solid state image sensor is relatively low, the definition of the reproduced image could not be made high. Such a definition is too low to apply the image pick-up apparatus to a defect detection system.

Further, in the known image pick-up apparatus, the light source and photodetector could not be used commonly for the reflection type inspection and transmission type inspection. Therefore, when the same specimen is to be observed both in the reflection type inspection and in the transmission type inspection, the specimen has to be first set in reflection type apparatus and then has to be removed to a transmission type apparatus. Therefore, the operation of user becomes very complicated and sometimes it is very difficult to inspect the same part of specimen in both modes. Moreover, there must be provided two apparatuses and this requires large space and high cost.

SUMMARY OF THE INVENTION

The present invention has for its object to provide an image pick-up apparatus which can provide an image signal having high S/N and small distortion.

It is another object of the invention to provide an image pick-up apparatus by means of which a specimen can be observed both in the reflection type inspection and transmission type inspection.

It is another object of the invention to provide an image pick-up apparatus in which a focus condition of an objective lens can be detected in an easy and accurate manner.

It is still another object of the invention to provide an image pick-up apparatus which can derive a color image signal having high S/N and small color deviation.

An image pick-up apparatus comprises a light source unit including at least one light source for emitting a light beam;

means for projecting a raster of the light beam upon a specimen to be inspected, said raster extending in a main-scanning direction and in a sub-scanning direction perpendicular to the main-scanning direction;

a light detector unit including at least one linear image sensor having a plurality of photoelectric converting elements aligned linearly in the main-scanning direction;

means for directing a light flux optically modulated by the specimen onto the linear image sensor of the light detector unit; and means for reading out photoelectric charges stored in the photoelectric converting elements of the linear image sensor to derive an image signal.

According to further aspect of the invention, an image pick-up apparatus comprises a light source for emitting a light beam;

a first deflection means for deflection the light beam emitted from the light source in a main-scanning direction at a main-scanning frequency;

a second deflection means for deflecting the light beam in a sub-scanning direction perpendicular to said main-scanning direction at a sub-scanning frequency lower than the main-scanning frequency;

means for projecting the light beam deflected two dimensionally onto a specimen;

a linear image sensor having a plurality of light receiving elements arranged in said main-scanning direction;

means for introducing a light flux optically modulated by the specimen onto said linear image sensor after deflecting the light flux in the sub-scanning direction in synchronism with said second deflection means; and means for reading out said linear image sensor at a given readout frequency which is at least equal to said main-scanning frequency to derive an image signal.

In a preferred embodiment of the image pick-up apparatus of the reflection type according to the invention, the light beam deflected two-dimensionally is projected onto the specimen by means of an objective lens and a light flux reflected by the specimen is collected by the objective leans and is further deflected by the second deflection means in the sub-scanning direction.

BRIEF DESCRIPTION OF THE DRAWINGS

FIG. 1 is a schematic view showing a principal construction of the image pick-up apparatus according to the invention;

FIG. 2 is a schematic plan view illustrating a positional relation between a beam spot and photoelectric converting elements;

FIGS. 3A, 3B and 3C are graphs representing a relation between a readout frequency at a linear iamge sensor and an amount of charge stored in the linear image sensor;

FIGS. 4A and 4B are schematic views showing a scanning line density;

FIG. 5 is a graph depicting a shading of an objective lens;

FIGS. 6 and 7 are schematic views showing two embodiments of the image pick-up apparatus according to the invention;

FIGS. 8A, 8B and 8C are graphs representing the relation between the readout frequency and amount of charge;

FIGS. 16A and 16B are schematic views representing a color deviation appearing in a vertical direction;

FIG. 17 is a waveform for correcting the color deviation;

FIGS. 20A, 20B, 20C and 20D are schematic views and graphs for explaining how to correct a color deviation in a horizontal direction;

FIG. 21 is a schematic view showing still another embodiment of the color image pick-up apparatus according to the invention;

FIGS. 22A, 22B and 22C are schematic views and signal waveforms for explaining how to correct the barrel distortion;

FIG. 31 is a block diagram illustrating a driving circuit of the apparatus shown in FIG. 30.

DESCRIPTION OF THE PREFERRED EMBODIMENTS

Figure 7:
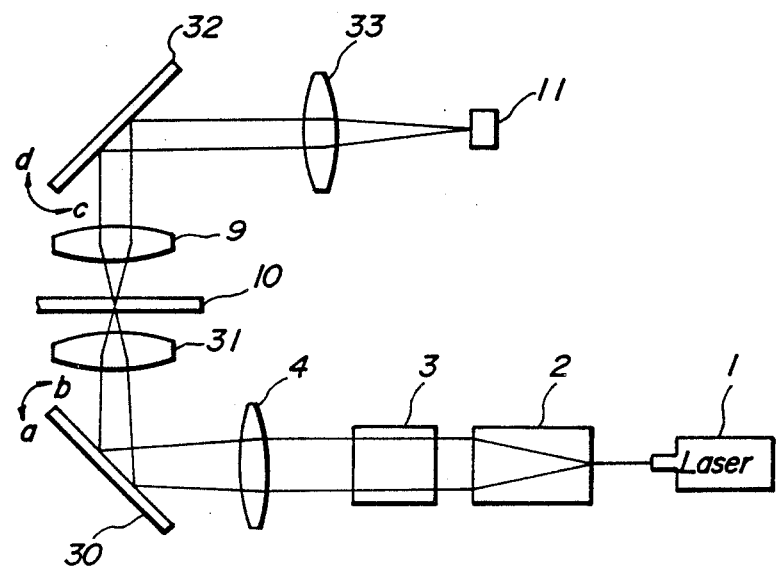

FIG. 1 is schematic view showing a first embodiment of the image pick-up apparatus according to the invention. A laser light beam emitted from a laser light source 1 is diverged by an expander 2 and then an expanded light flux is made incident upon an acoustic-optical element 3 constituting a first deflecting element. The acoustic-optical element 3 reciprocally deflects the light beam at a main-scanning frequency $f_1$ in a main-scanning direction, i.e. X direction on a specimen to be inspected. The light beam deflected by the acoustic-optical element 3 is focused by a condenser lens 4 and then is introduced onto a vibrating mirror 8 via relay lens 5, half mirror 6 and totally reflecting mirror 7. The vibrating mirror 8 serves as a second deflecting element which deflects the light beam at a suitable scanning frequency in a sub-scanning direction i.e. Y direction perpendicular to the X direction. Usually the scanning frequency is made equal to a horizontal scanning frequency $f_H$. In FIG. 1, the X direction is perpendicular to the plane of the drawing and the Y direction is in the plane of the drawing. The light beam reflected by the vibrating mirror 8 is focused by an objective lens 9 onto a specimen 10 as a fine spot. In this manner, there is formed a raster of the light beam on the specimen 10 and the specimen is scanned in the X and Y directions. In the present embodiment, a light flux reflected by the specimen 10 is detected to derive optical information about the specimen. To this end, the light flux reflected by the specimen 10 is collected by the objective lens 9 and is focused onto a linear image sensor 11 by means of the vibrating mirror 8, totally reflecting mirror 7 and half mirror 6. That is to say, an image of a small part of the specimen is projected on a part of the linear image sensor 11. It should be noted that the linear image sensor 11 is arranged at a position conjugated with the relay lens 5 with respect to the specimen 10. A number of photoelectric converting elements of the linear image sensor 11 are arranged in the sub-scanning direction X. These photoelectric converting elements are readout at a readout frequency $f_2$ to derive an output signal. Usually the readout frequency is made equal to a horizontal scanning frequency $f_v$.

FIG. 2 is a schematic plan view showing a positional relation between the light spot projected on the linear image sensor 11 and the photoelectric converting elements of the linear image sensor 11. In the present embodiment, the light spot 12 projected on the linear image sensor 11 is slightly larger than a light receiving aperture of the photoelectric converting elements 11a, 11b, ... 11n. Due to the deflecting action of the acoustic-optical element 3, the beam spot 12 is deflected in the X direction aligned with the array of the photoelectric converting elements 11a to 11n. Therefore, the light beam reflected from the specimen 10 is received by the photoelectric converting 11a to 11n in a linear manner and is successively elements converted into an electric signal. According to the invention, since the photoelectric converting elements are related to pixels of an image of the specimen 10 one by one, any distortion of the image can be effectively prevented as long as the readout frequency of the linear image sensor is not fluctuated, even if the scanning frequency in the acoustic-optical element 3 is varied. Contrary to this, in the known apparatus when the scanning frequency is varied, the image is distorted. Moreover, in the present embodiment, since the beam spot 12 is made larger than the photoelectric converting element, it is possible to derive the output signal stably even if a position of the beam spot impinging upon the linear image sensor fluctuates or the apparatus is subjected to external vibration. Particularly, when the objective lens is formed by a zoom lens, a diameter of the beam spot is liable to vary in accordance with the zooming, and thus the above feature is important in the image pick-up apparatus comprising the zoom lens.

FIGS. 3A to 3C are graphs illustrating a relation between the readout frequency for the linear image sensor 11 and amounts of charges stored in the photoelectric converting elements. Since the photoelectric converting element has an ability for accumulating charges, an amount of charges stored in the element is proportional to an amount of light received by the element until a saturation charge amount is achieved.

FIG. 3A illustrates an amount of charges stored in the photoelectric converting element when the readout frequency $f_2$ of the linear image sensor is made equal to the main-scanning frequency $f_1$, i.e. every time the specimen 10 is scanned by the light beam, the charges stored in the photoelectric converting elements are readout once. FIG. 3B shows a case of $f_2=f_1/2$, i.e. every time the specimen is scanned twice, the linear image sensor 11 is scanned once. FIG. 3C represents a case in which every time the specimen is scanned three times, the linear image sensor is scanned once, i.e. $f_2=f_1/3$.

According to the invention, the main-scanning frequency $f_1$ of the acoustic-optical element 3 for deflecting the light beam in the main-scanning frequency is set substantially to an integer multiple of the readout frequency $f_2$ of the linear image sensor 11, so that the light reflected from the specimen 10 is received by the image sensor 11 by a plurality of times. Then, it is possible to obtain the output signal having a larger amplitude than that of the output signal which will be derived when the main-scanning frequency $f_1$ is set to the readout frequency $f_2$ of the linear image sensor 11, and thus a signal-to-noise ratio of the output signal is made much higher.

Now the definition of the photoelectrically converted output signal will be explained. FIG. 4A is a schematic view showing the scanning on the specimen in the known scanning type microscopic image pick-up apparatus, and FIG. 4B is a schematic view illustrating the scanning appearance of the image pick-up apparatus according to the invention. In the known apparatus, when use is made of the light source having a small output power, it is necessary to decrease the main-scanning speed, so that the scanning line density is liable to be small as shown in FIG. 4A. Therefore, optical information of the specimen situating between the scanning lines is lost completely. Contrary to this, according to the invention since the main-scanning frequency $f_1$ can be made higher than the readout frequency $f_2$ of the linera image sensor 11, it is possible to derive the output signal having the large amplitude even though the main-scanning speed is made high and thus the scanning line density is made high as shown in FIG. 4A. In this manner, according to the invention, the scanning line density can be equivalently made higher without causing the decrease in the scanning speed and S/N, and therefore the optical information of the specimen can be reproduced very accurately. In the apparatus for detecting defects in patterns such as photomask pattern and reticle pattern for use in the semiconductor manufacturing with the aid of the known scanning type microscope, fine defects existing between successive scanning lines are not detected. However, in the defect detecting apparatus comprising the image pick-up apparatus according to the invention, such fine defects can be detected positively and accurately.

Next, the deletion of shading of the objective lens will be explained. In general, when the deflected light beam is made incident upon the objective lens, there occurs the shading as illustrated in FIG. 5. That is to say, an amount of light transmitting through a peripheral portion of the lens is made smaller than that transmitted through a central portion. This results in that a peripheral portion of a reproduced image is darker than a central portion. In the known iamge pick-up apparatus including a photomultiplier tube, when the above shading is to be corrected by changing mechanically the scanning speed at the deflecting device, the reproduced image might be distorted accordingly. It is possible to correct the shading electrically, but it is very difficult to effect the correction uniformly, because the scanning speed at the defecting device fluctuates. In the image pick-up apparatus according to the invention, since the image of specimen is corresponded to the photoelectric converting elements of the linear image sensor one by one, the shading can be corrected mechanically by increasing the scanning speed in the central region of the objective lens and by decreasing the scanning speed in the peripheral region. In this case the distortion of the image never occurs as long as the linear image sensor is readout at the constant readout frequency. Further, the shading can be also corrected electrically by amplifying the photoelectric output signal from the linear image sensor with an amplification which varies in accordance with the position of the objective lens.

FIG. 6 is a schematic view showing another embodiment of the image pick-up apparatus according to the invention. In this embodiment, portions similar to those shown in FIG. 1 are denoted by the same reference numerals used in FIG. 1. In the present embodiment, between vibrating mirror 8 and objective lens 9 are arranged relay lenses 20 and 21 which serves to project a raster image formed by acoustic-optical element 3 and vibrating mirror 8 onto a specimen 10 by means of the objective lens 9. In this construction, it is possible to project onto the specimen 10 the raster image without distortion and thus a distortion free image can be reproduced.

FIG. 7 is a schematic view illustrating another embodiment of the transmission type image pick-up apparatus according to the invention. Also in this embodiment, portions similar to those shown in FIG. 1 are denoted by the same reference numerals used in FIG. 1. A light beam emitted from a laser light source 1 is widened by an expander 2 and is made incident upon a first vibrating mirror 30 via an acoustic-optical element 3 constituting a first deflecting device and a relay lens 4. The first vibrating mirror 30 is rotated as shown by arrows a and b to effect the sub-scanning. The light beam reflected by the first vibrating mirror 30 is focused by a condenser lens 31 into a fine spot which is projected onto a speciment 10. In this manner, the specimen 10 is scanned in the X and Y directions. A light flux transmitted through the specimen 10 is collected by an objective lens 9 and is made incident upon a second vibrating mirror 32. The second vibrating mirror 31 is rotated in synchronism with the first vibrating mirror 30 as indicated by arrows c and d. It should be noted that when the first mirror 30 is swung in the directions a and b, the second mirror 31 is swung in the directions c and d, respectively. The light beam reflected by the second vibrating mirror 32 is projected by an imaging lens 33 onto a linear image sensor 11 aa a fine spot. Also in the transmission type image pick-up apparatus according to the invention, any distortion of image can be prevented effectively. Further, if the main-scanning frequency $f_1$ of the acoustic-optical deflection element 3 is made higher than the readout frequency $f_2$ of the linear image sensor 11 by several times, it is possible to derive the photoelectric output signal having a high S/N.

In FIGS. 3B and 3C, the readout frequency $f_2$ of the linear image sensor is adjusted to derive the photoelectric output signal having high S/N and resolution. According to the invention, it is also possible to adjust the main-scanning frequency $f_1$ at the acoustic-optical deflection element 3 as illustrated in FIGS. 8A to 8C instead of the readout frequency $f_2$. In this embodiment, since the readout frequency $f_2$ can be remained always equal to the horizontal scanning frequency $f_H$, the signal processing may be made much simpler than in the case of FIGS. 3A to 3C.

Figure 9:
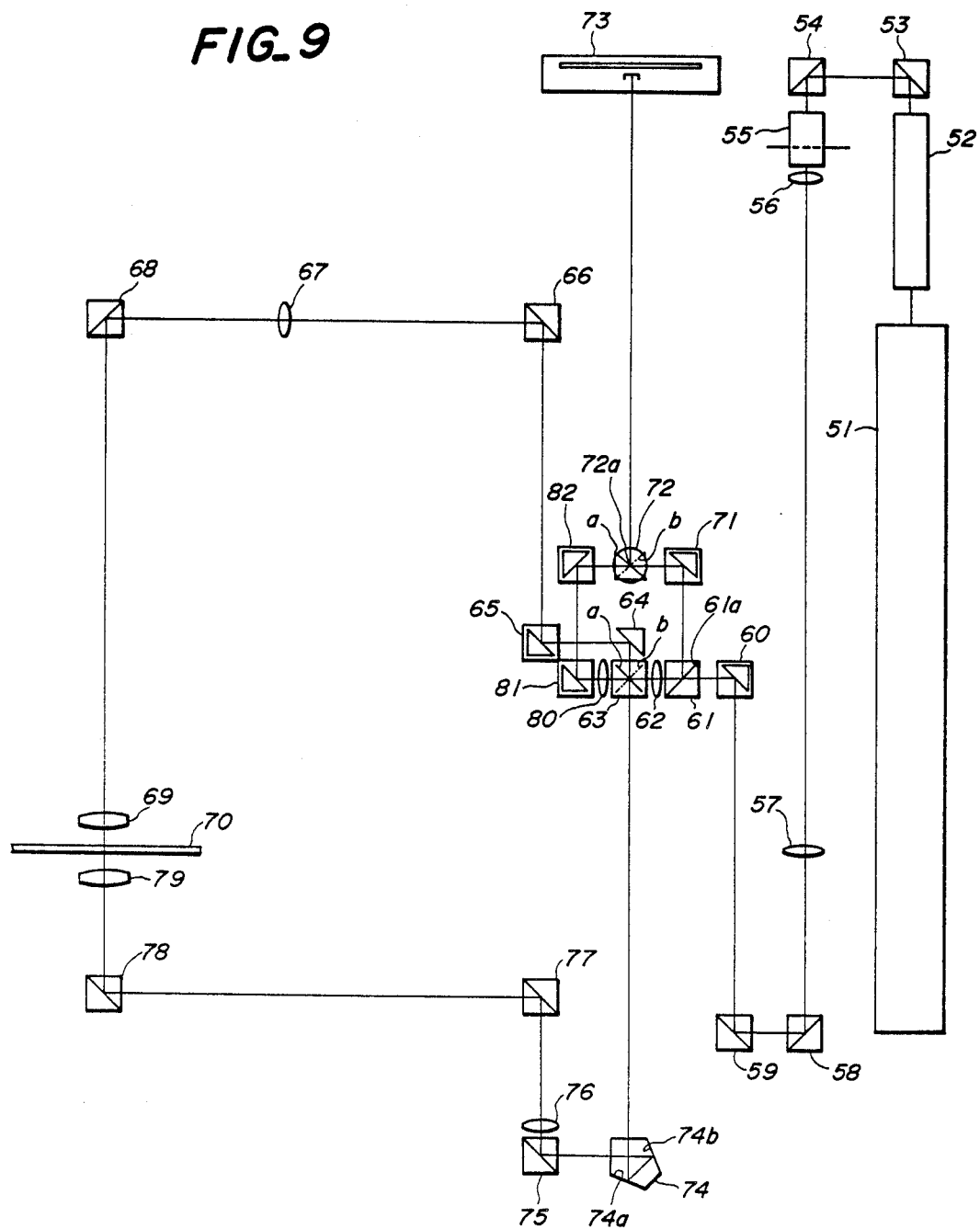
FIG. 9 is a schematic view illustrating another embodiment of the image pick-up apparatus according to the invention.

FIG. 9 is a schematic view depicting another embodiment of the image pick-up apparatus according to the invention in which the specimen can be inspected both by reflection and transmission modes. A light beam emitted from a laser light source 51 is expanded by an expander 52 and is made incident upon an acoustic-optical element 55 serving as a first deflection device via rectangular prisms 53 and 54. The acoustic-optical element 55 deflects the light beam in the main-scanning direction X at a main-scanning frequency $f_1$. The light beam deflected by the acoustic-optical element 55 is focused by a focusing lens 56 and is made incident upon a beam splitter 61 by means of relay lens 57, rectangular prisms 58, 59 and 60. The light beam is transmitted through a half mirror 61a of the beam splitter 61 and is made incident upon a lens 62. For the light beam directing toward a specimen the imaging lens 62 serves as a kind of relay lens. The light beam emanating from the lens 62 is made incident upon a vibrating mirror 63 serving as a second deflecting device. The light beam is deflected by the vibrating mirror 63 in the sub-scanning direction Y perpendicular to the X direction. The vibrating mirror 63 is selectively assuming into a first position denoted by a solid line a and a second position represented by a chain line b, these positions being perpendicular to each other. That is to say, when the apparatus is used as the reflection type image pick-up apparatus, the mirror 63 is set to the position a, while in the transmission type the mirror 63 is changed into the position b. At first, the reflection type will be explained. In this case, the light beam reflected by the mirror 63 in the position a is further reflected by rectangular prisms 64, 65 and 66 and is made incident upon a relay lens 67. Then the light beam emanating from the relay lens 67 is reflected by a rectangular prism 68 and is focused by an objective lens 69 onto a specimen 70 as a fine light spot. Since the light beam impinging upon the specimen 70 is deflected in the X and Y directions by means of the first and second deflecting devices 55 and 63, the specimen 70 is raster-scanned.

A light flux reflected by the specimen 70 is collected by the objective lens 69 and is made incident again upon the vibrating mirror 63 by means of rectangular prism 68, relay lens 67, and rectangular prisms 66, 65 and 64. After being reflected by the vibrating mirror 63, the light beam is made incident upon the half mirror 61a of the beam splitter 61 via the imaging lens 62. The light beam reflected by the half mirror 61a is made incident upon an optical path switching device 72 via a rectangulr prism 71. The optical path switching device 72 comprises a rectangular prism which is rotatable by an angle of 90°. That is to say, a reflecting surface 72a of the rectangular prism is set into a position a shown by a solid line in the reflection mode, while in the transmission mode the reflecting surface 72a is changed into a position b denoted by a chain line. The rotation of the rectangular prism of the optical path switching device 72 is effected by a suitable driving mechanism (not shown) in conjunction with the rotation of the vibrating mirror 63. The light beam reflected by the optical path switching prism 72 is made incident upon a linear image sensor 73 as a fine spot. It shoudl be noted that the linear image sensor comprises a number of photoelectric converting elements arranged in the main-scanning direction X. In the reflection mode, the lens 62 serves as the imaging lens which forms an image of the specimen 70 onto the linear image sensor 73. By reading out photoelectric charges stored in the photoelectric converting elements of the linear image sensor 73 at a readout frequency $f_2$, there is derived a photoelectric output signal.

Now the transmission mode will be explained. In this mode of operation, the vibrating mirror 63 and optical path switching device 72 are changed into the position b. Then, the light beam impinging upon the vibrating mirror 63 is reflected downward and is reflected by reflecting surfaces 74a and 74b of a pentagonal prism 74. Then the light beam is further reflected by a rectangular prism 75 and is made incident upon a condenser lens 79 via relay lens 76, and rectangular prism 77 and 78. The light beam diverged by the condenser lens 79 is projected onto the specimen 70 from its rear surface as a fine spot. In the present embodiment, since the pentagonal prism 74 for reversing left and right is arranged in the optical path of the transmission mode, the image obtained in the transmission mode is not made opposite horizontally to that in the reflection mode.

A light flux transmitted through the specimen 70 is collected by the objective lens 69 and is made incident upon the vibrating mirror 73 via the rectangular prism 68, relay lens 67, rectangular prisms 66, 65 and 64. Since a rear surface of the vibrating mirror 63 is coated with a reflecting layer, the light beam is reflected by the rear surface of the vibrating mirror 63 and is made incident upon an imaging lens 80. The imaging lens 80 forms an image of the specimen 70 onto the linear image sensor 73 via rectangular prisms 81 and 82 and optical path switching device 72 set in the position b. It should be noted that the linear image sensor 73 is positioned at a focal point of the imaging lens 80. In other words, the imaging lenses 62 and 80 are arranged at conjugated positions with respect to the linear image sensor 73.

In the present embodiment, since both surfces of the vibrating mirror 63 are formed as the reflection surface, in the transmission mode the light beam projecting upon the specimen and the light beam emanating from the specimen can be deflected in the sub-scanning direction Y by the same vibrating mirror 63, the image of the specimen can be accurately projected onto the linear image sensor 73 as compared with a case in which two separate vibrating mirrors are driven in synchronism with each other.

Further, in the reflection mode, the raster image is formed on a pupil position of the relay lens 67 by means of the relay lens 57 and imaging lens 62 and then is projected onto the specimen 70 by means of the objective lens 69. In the transmission mode, the raster image is formed at a pupil of the relay lens 76 by means of the relay lens 57 and imaging lens 62 and then is projected onto the specimen 70 by means of the condenser lens 79. Therefore, in both modes, it is possible to form the raster image without distortion on the specimen 70.

Figure 10:
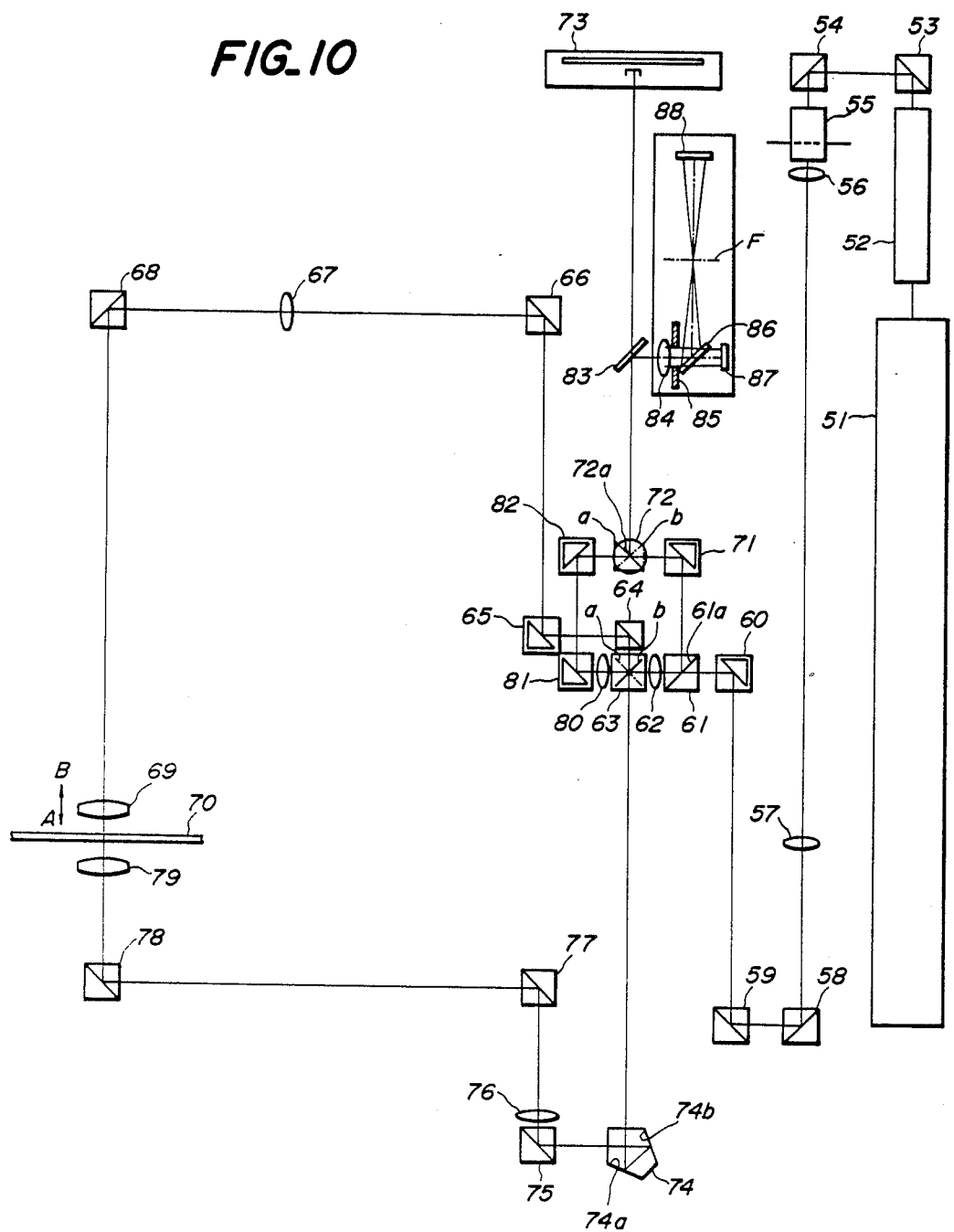
FIG. 10 is a schematic view depicting a modified embodiment of the image pick-up apparatus shown in FIG. 9.

FIG. 10 is a schematic view showing still another embodiment of the image pick-up apparatus according to the invention. In the present embodiment, there is provided an automatic focus control. In FIG. 10, portions similar to those illustrated in FIG. 9 are denoted by the same reference numerals shown in FIG. 9 and their explanation is omitted. In the present embodiment, a beam splitter 83 is arranged in the optical path between the optical path switching device 72 and linear image sensor 73. A part of the light beam reflected by the rectangular prism of the optical path switching device 72 is reflected by the beam splitter 83 and is made incident upon a convex lens 84 which forms an image of the specimen 70 on an image plane F conjugated with the linear image snesor 73. The light beam emanating from the convex lens 84 is transmitted through a slit plate 85 and is made incident upon a half mirror 86. A light beam transmitted through the half mirror 86 is received by a first photodetector 87, and a light beam reflected by the half mirror 86 is received by a second photodetector 88. The first and second photodetectors 87 and 88 are arranged before and after the focus plane F of the convex lens 84. Therefore, amounts of light impinging upon the first and second photodetectors 87 and 88 vary in opposite directions in accordance with a defocus condition of the objective lens 60 with respect to the specimen 70. In this case, a light receiving area of the photodetector is made smaller than a cross section of the incident light beam. Then, by comparing photoelectric output signals supplied from the first and second photodetectors 87 and 88, it is possible to detect the focus condition of the objective lens 69 in an easy and accurate manner.

Figure 11:
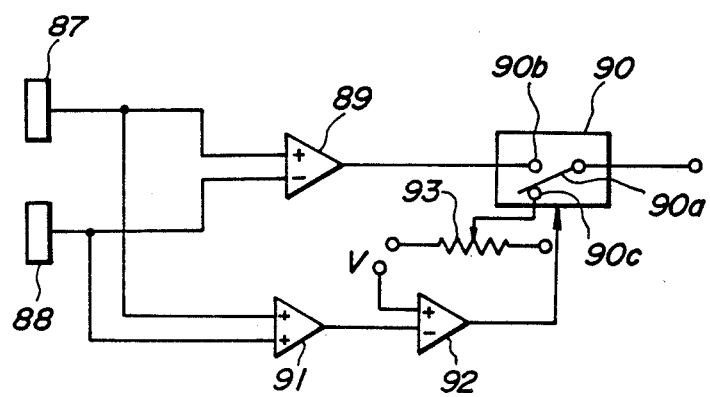
FIG. 11 is a circuit diagram of a focus detecting device shown in FIG. 10.

FIG. 11 is a circuit diagram showing an embodiment of an automatic focus control circuit. Outputs of the first and second photodetectors 87 and 88 are connected to positive and negative inputs of a differential amplifier 89, respectively to derive a difference between the output signals of the photodetectors as a focusing error signal. The focusing error signal thus derived is supplied through a gate circuit 90 to an objective lens driving circuit not shown to move the objective lens 69 along its optical axis as shown by arrows A and B in FIG. 10. The gate circuit 90 is provided for preventing such a situation that the control of objective lens could not be effected even if the objective lens 69 deviates from the in-focus position to a large extent. That is to say, the output signals from the first and second photodetectors 87 and 88 are summed at an adder 91 and a sum signal thus formed is supplied to a negative input of a differential amplifier 92 serving as a comparator. To a postiive input of the differential amplifier 92 is applied a reference voltage V. An output of the differential amplifier 92 is connected to a control input of the switching circuit 90. When the objective lens 69 deviates from the in-focus condition largely, amounts of light impinging upon the photodetectors 87 and 88 decrease extremely and thus the sum signal form the differential amplifier 91 becomes lower than the reference voltage V. Then, a switching arm 90a of the switch 90 is changed from a contact 90b to a contact 90c which is connected to a potentiometer 93. The potentiometer 93 is connected to the voltage source and has been suitably set such that when the switch 90 is hanged into the contact 90c, there is produced a reference position voltage by means of which the objective lens 69 is automatically driven into a reference position. By suitably adjusting the potentiometer 93, it is possible to keep the objective lens 69 always within the controllable range. This is particularly advantageous when the objective lens is replaced by another objective lens or the apparatus is switched between the transmission mode and reflection mode.

As explained above, according to the invention since an amount of the light impinging upon the linear image sensor can be substantially increased, the focus condition can be detected by using a part of the inspection light, while S/N of the photoelectric output signal from the linear image sensor can be maintained still high.

In order to effect the automatic focus control in case of the transmission mode, it is preferable to move the specimen 70 with respect to the objective lens 69 and condenser lens 79 in accordance with the focusing error signal.

Figure 12:
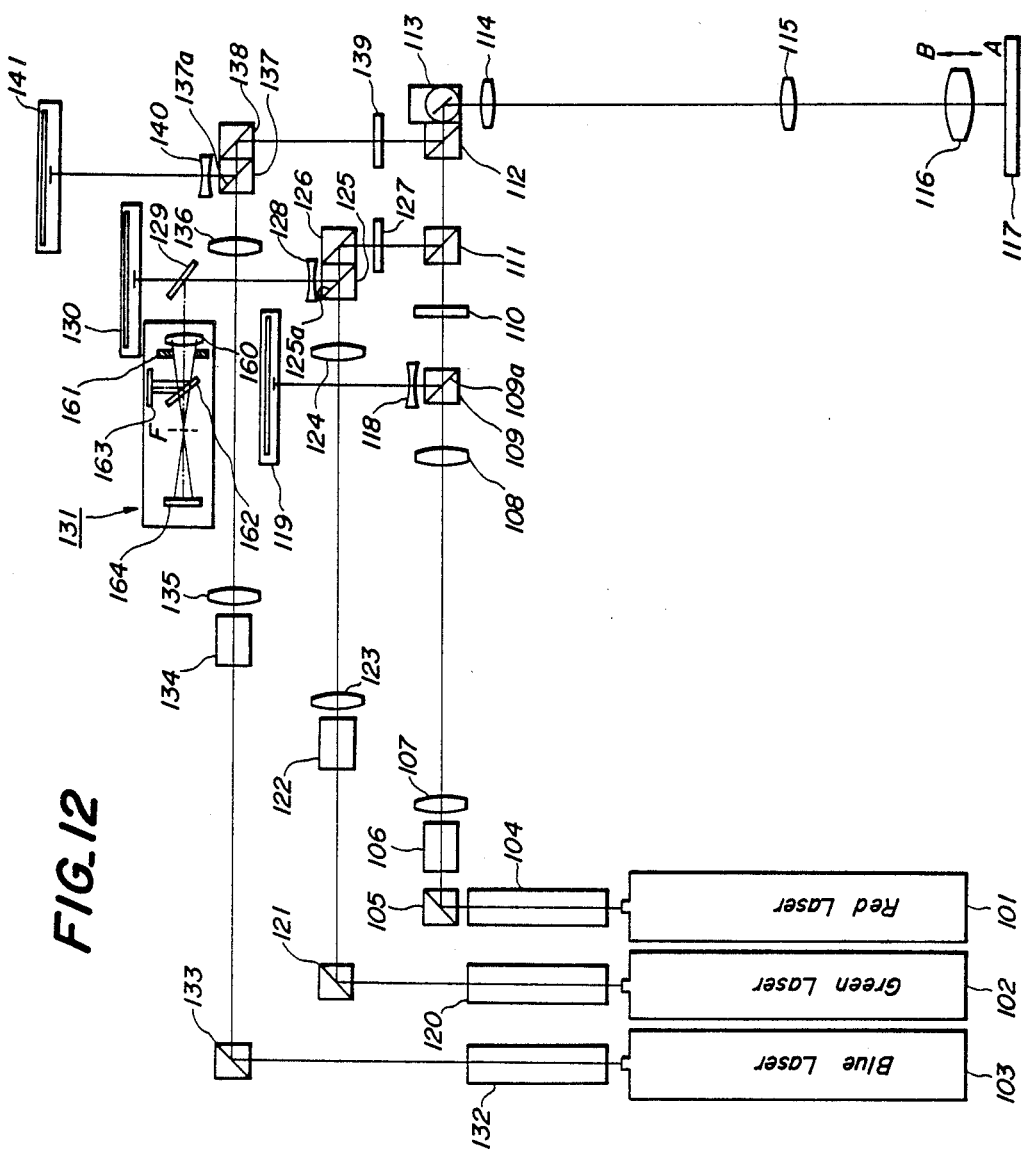
FIG. 12 is a schematic view illlustrating an embodiment of the color image pick-up apparatus according to the invention.

FIG. 12 is a schematic view showing an embodiment of the color image pick-up apparatus according to the invention. The color image pick-up apparatus comprises red, green and blue light sources 101, 102 and 103. In the present embodiment, the red light source 101 is formed by He-Ne laser emitting red light of wavelength of 633 nm, the green light source 102 is constructed by Ar laser emitting blue light having wavelength of 488 nm, and the blue light source 103 comprises He-Cd laser which emits blue light having wavelength of 442 nm. It should be noted that all the light beams emitted from the laser light sources 101 to 103 are linearly polarized. The red light beam emitted from the light source 101 is expanded by an expander 104 into a parallel light flux which is made incident upon a first acoustic-optical element 106 via a rectangular prism 105. The first acoustic-optical element 106 serves as a first deflecting device and deflects the red beam in the main-scanning direction X at a main-scanning frequency $f_1$. The light beam deflected by the first acoustic-optical element 106 is transmitted successively through relay lenses 107 and 108, first polarization prism 109 and quarter wavelength plate 110 and is made incident upon a first dichroic mirror 111. The first dichroic mirror 111 reflects only green light and transmits light having other wavelengths. Therefore, the red light beam is transmitted through the first dichroic mirror 111 and is then made incident upon a second dichroic mirror 112 which reflects only blue light. Thus, the red light beam is transmitted through the second dichroic mirror 112 and is made incident upon a vibrating mirror 113 constituting a second deflecting device. The vibrating mirror 113 deflects the red light beam in a sub-scanning direction Y perpendicular to the main-scanning direction X at a sub-scanning frequency. The red light beam deflected by the vibrating mirror 113 is made incident upon an objective lens 116 via relay lenses 114 and 115 and is focused onto a specimen 117 as a small light spot. In this manner, the specimen can be raster-scanned by the red light spot in the X and Y directions.

A red light flux reflected by the specimen 117 is collected by the objective lens 116 and is made incident upon the vibrating mirror 113 via the relay lens 115 and 114. The red light beam reflected by the vibrating mirror 113 is transmitted through the first and second dichroic mirrors 112 and 111 and the quarter wavelength plate 110 and then is made incident upon the first polarization prism 109. Since the light beam impinging upon the first polarization prism 109 has passed through the quarter wavelength plate 110 twice, its polarization plane has rotated by 90°. Therefore, the red light beam is now reflected by a polarization film 109a of the polarization prism 109 and is made incident upon a first linear image sensor 119 via a first concave lens 118. The linear image sensor 119 is arranged in a focal plane of the optical system composed of the relay lens 114 and concave lens 118 and comprises a number of photoelectric converting elements linearly arranged in the main-scanning direction X which is perpendicular to the plane of drawing of FIG. 12. The linear image sensor 119 is readout at a readout frequency $f_2$ to derive a photoelectric output signal.

A green light beam emitted from the green laser light source 102 is transmitted through an expander 120 and is made incident upon a second acoustic-optical element 122 via a rectangular prism 121. The acoustic-optical element 122 deflects the green light beam in the main-scanning direction X at the main-scanning frequency $f_1$. The green light beam deflected by the second acoustic-optical element 122 is transmitted through relay lenses 123 and 124 and second polarization prism 125, and then is reflected by a rectangular prism 126. Then the green light beam is transmitted through a quarter wavelength plate 127 and is made incident upon the first dichroic mirror 111. The green light beam is reflected by the first dichroic mirror 111 and then is introduced into the common optical path to the red light beam. That is to say, the green light beam reflected by the first dichroic mirror 111 is transmitted through the second dichroic mirror 112 and is made incident upon the vibrating mirror 113. The green light beam deflected in the sub-scanning direction Y by the vibrating mirror 113 is focused on the speciment 117 by means of the relay lenses 114 and 115 and objective lens 116. In this case, since the green light beam is transmitted through the same optical path as the red light beam after the first dichroic mirror 111, the same portion of the specimen 117 is simultaneously scanned by the red and green light beams.

A green light flux reflected by the specimen 117 is collected by the objective lens 116 and is transmitted through the relay lenses 115, 114, vibrating mirror 113, and second dichroic mirror 112, and is, reflected by the first dichroic mirror 111. After the green light beam is further transmitted through the quarter wavelength plate 127 and is reflected by the rectangular prism 126, it is made incident upon the polarization prism 125. Since the green light beam impinging upon the polarization prism 125 has passed through the quarter wavelength plate 127 twice, it is now reflected by a polarization film 125a and is made incident upon a second linear image sensor 130 via a second concave lens 128 and half mirror 129. A light flux reflected by the half mirror 129 is made incident upon a focus detection device 131. The second linear image sensor 130 is arranged at a focal point of an optical system consisting of the relay lens 114 and second concave lens 128 and comprises a number of photoelectric converting elements aligned linearly in the main-scanning direction X perpendicular to the plane of the drawing of FIG. 12. The linear image sensor 130 is readout at the sub-scanning frequency $f_2$ to derive a green color output signal.

A blue light beam emitted from the blue laser light source 103 is made incident upon a third acoustic-optical element 134 by means of expander 132 and rectangular prism 133, and is deflected therein in the main-scanning direction X at the main-scanning frequency $f_1$. The deflected blue light beam is transmitted through a third polarization prism 137 via relay lenses 135 and 136 and is reflected by a rectangular prism 138. Then the blue light beam is passed through a quarter wavelength plate 139 and is reflected by the second dichroic mirror 112. Further the blue light beam propagates along the common optical path and is made incident upon the vibrating mirror 113. The blue light beam is deflected by the vibrating mirror 113 in the sub-scanning direction Y and is projected onto the specimen 117 via the relay lenses 114, 115 and objective lens 116.

Blue light flux reflected by the specimen 117 is collected by the objective lens 116 and is deflected again in the sub-scanning direction Y by the vibrating mirror 113 via the relay lenses 115 and 114. The blue light beam deflected by the vibrating mirror 113 is reflected by the second dichroic mirror 112, rectangular prism 138 and polarization film 137a of the third polarization prism 137 and then is projected upon a third linear image sensor 141 via a third concave lens 140. The third linear image sensor 141 is arranged at a focal point of the relay lens 114 and third concave lens 140 and includes a number of photoelectric converting elements aligned linearly in the main-scanning direction X. The third linear image sensor 141 is readout also at the readout frequency $f_2$ to derive a blue image signal.

In the present embodiment, the vibrating mirror 113 is commonly used for all the red, green and blue light beams, and therefore any deviation in the sub-scanning direction Y between red, green and blue rasters can be effectively avoided.

Figure 13:
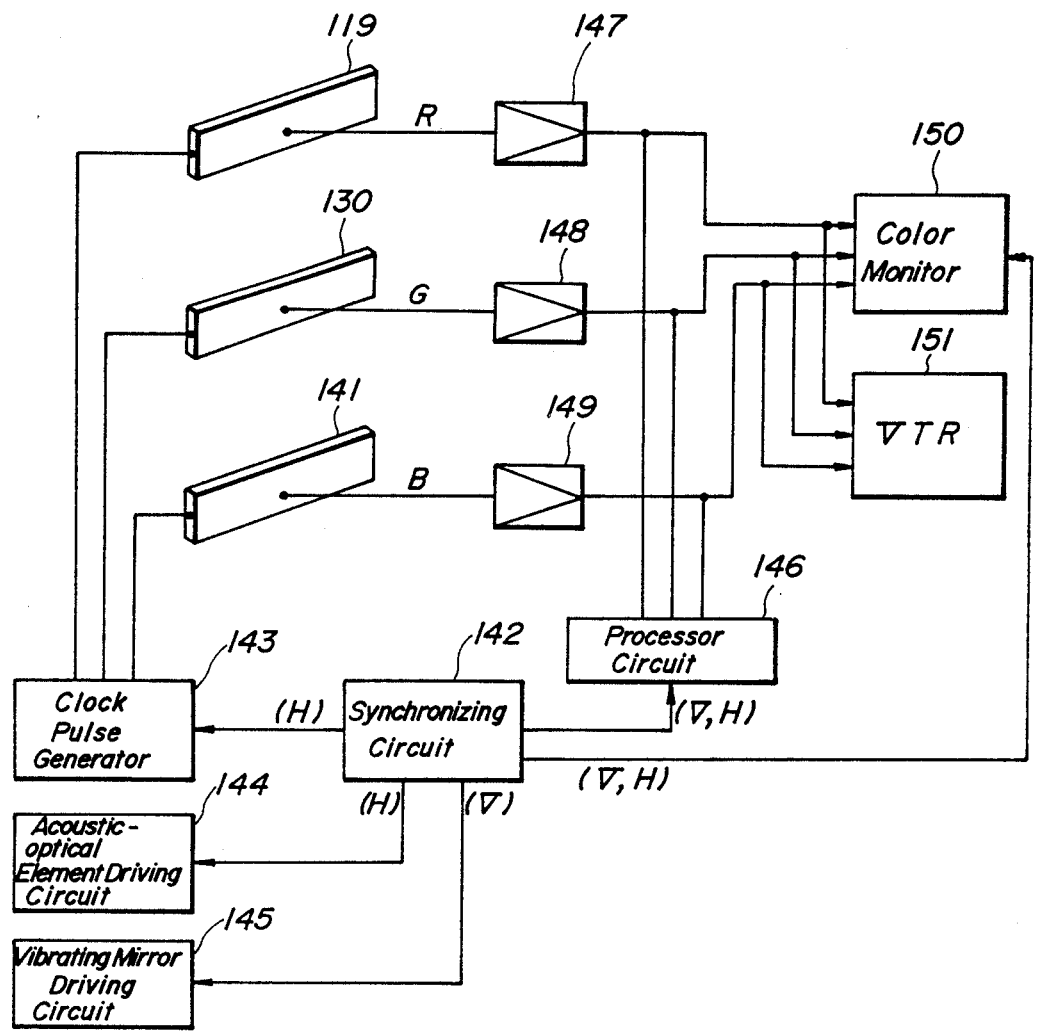
FIG. 13 is a block diagram depicting an embodiment of a driving circuit of the apparatus shown in FIG. 12.

FIG. 13 is a circuit diagram showing an embodiment of a driving circuit of the color image pick-up apparatus shown in FIG. 12. The driving circuit comprises a synchronizing circuit 142 generating vertical and horizontal synchronizing signals V and H having vertical and horizontal scanning frequency f V and $f_H$, respectively. The horizontal synchronizing signal H is supplied to a clock pulse generator 143 which then generates clock pulses for reading out the first, second and third linear image sensors 119, and 130 and 141. These reading out clock pulses are supplied to the first, second and third linear image sensors 119, 130 and 141 and photo-carries stored in the photoelectric converting elements of the sensors are readout in synchronism with each other at the readout frequency $f_2$ which is equal to the horizontal scanning frequency $f_H$. Therefore, a repetition frequency $f_c$ of the clock pulses supplied from the clock pulse generator 143 is represented by $N \cdot f_H$, wherein N is the number of the photoelectric converting elements of the linear image sensor. The horizontal and vertical synchronizing signals H and V generated from the synchronizing circuit 142 are supplied respectively to acoustic-optical element driving circuit 144 and vibrating mirror driving acoustic-optical element driving circuit 143. Then, there is generated from the driving circuit 144 a driving signal having the main-scanning frequency $f_1$, and the first, second and third acoustic-optical elements 106, 122 and 134 are driven in synchronism with each other at the main-scanning frequency $f_1$. The vibrating mirror driving circuit 145 generates a mirror driving signal having a substantially triangular waveform by means of which the mirror 133 is vibrated at the vertical scanning frequency $f_V$. In the present embodiment, the main-scanning frequency $f_1$ is made equal to the frequency $f_H$ of the horizontal synchronizing signal. However, the main-scanning frequency $f_1$ may be set higher than the frequency $f_H$ of the horizontal synchronizing signal. In any case, since the linear image sensor has the charge accumulating function, even if the main-scanning frequency $f_1$ fluctuates, image distortion and color registration error do not occur as long as the linear image sensors 119, 130 and 141 and readout in synchronism with each other at the constant readout frequency $f_2$.

The red, green and blue color image signals R, G and B readout of the linear image sensors 119, 130 and 141 are amplified by amplifiers 147, 148 and 149, and then vertical and horizontal synchronizing signals V and H supplied from a processor circuit 142 are added to the color signals. The color signals thus processed to a color monitor 150 to reproduce a color image and are recorded by a video tape recorder 151.

In the color image pick-up apparatus, since the red, green and blue light beams are projected onto the specimen by means of the common optical system, it is necessary to correct chromatic aberration of the optical system. In the present embodiment, to this end there are arranged the concave lenses 118, 128 and 140 in front of the linear image sensors 119, 130 and 141, respectively, movably along the optical axes, and further the linear image sensors are arranged also movably in the optical axis directions. At first, the second concave lens 128 and second linear image sensor 130 are moved in the optical axis direction such that the green light image is correctly formed on the second linear image sensor 130. Then the first and third concave lenses 118 and 140 and linear image sensors 119 and 141 are adjusted along the optical axes such that the red and blue images are correctly formed in the first and third linear image sensors 119 and 141, respectively. In this manner, the chromatic aberration can be effectively corrected. It should be noted that it is not always necessary to move the second concave lens 128, but the adjustment can be effected easily by moving the concave mirror 128 along the optical axis.

When the chromatic aberration is compensated for by means of the concave lenses, it is possible to increase the deflection angle of the light beam impinging upon the linear image sensor. Moreover, a variable magnification lens may be utilized instead of a movable concave lens.

As illustrated in FIG. 12, the focus detection device 131 comprises a convex lens 160, slit 161, half mirror 162, first and second photodetectors 163 and 164. In the present embodiment, the focus condition of the optical system is detected by utilizing the green light beams. The construction and operation of the focus detection device of the present embodiment are entirely same as those of the embodiment illustrated in FIG. 10. The objective lens 116 is moved along its optical axis in direction A or B in accordance with a focusing error derived by processing output signals from the first and second photodetectors 163 and 164.

As explained above in the color image pick-up according to the invention, since the vibrating mirror for effecting the vertical scan is commonly used for the red, green and blue light beams, any color registration error in the vertical direction can be avoided completely. Further, color registration error in the horizontal direction can be also prevented as long as the first, second and third linear image sensors are scanned in synchronism with each other even if the main-scanning timings in the first, second and third acoustic-optical elements are deviated from each other.

Figure 14:
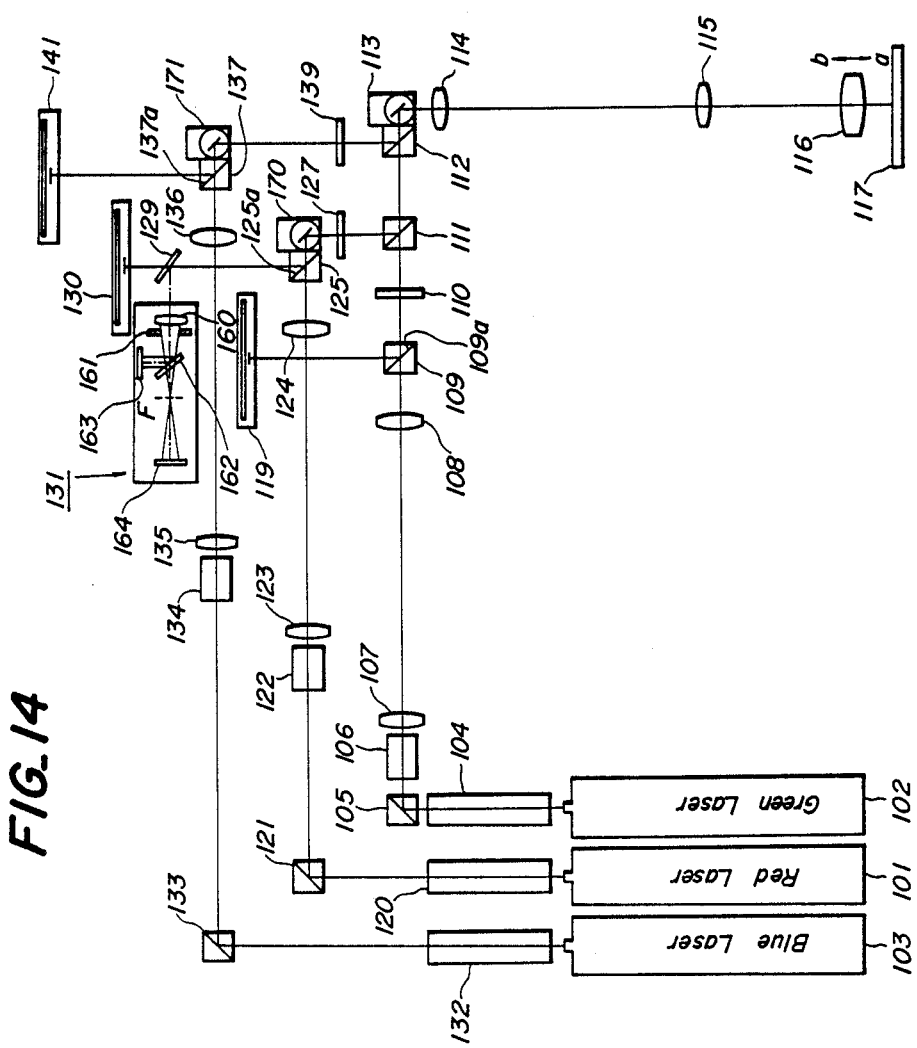
FIG. 14 is a schematic view illustrating another embodiment of the color image pick-up apparatus according to the invention.

FIG. 14 is a schematic view showing another embodiment of the color image pick-up apparatus according to the invention. In the present embodiment, the color registration error in the sub-scanning direction, i.e. vertical direction can be corrected much more completely. As explained above, in the color image pick-up apparatus according to the invention, since the vibrating mirror is commonly used for the three color beams, the color deviation in the vertical direction due to mechanical fluctuation can be avoided. However, the objective lens has different refractive indices for the red, green and blue light beams and a chromatic aberration occurs. This results in that dimensions of rasters formed by the red, green and blue light beams on the first, second and third linear image sensors, respectively are not made identical with each other, and thus there is produced color deviation in the vertical scanning direction.

In the embodiment shown in FIG. 14, portions similar to those illustrated in FIG. 12 are represented by the same reference numerals used in FIG. 12 and their explanation is omitted. In this embodiment, the position of the red and green lasers 101 and 102 are exchanged with each other and the first dichroic mirror 111 is constructed to reflect selectively the red light beam. Further the rectangular prisms 126 and 138 inserted in the optical paths of the red and blue light beams are replaced by first and second vibrating correction mirrors 170 and 171 which deflect the beams in the sub-scanning direction Y. Therefore, the red light beam deflected in the main-scanning direction X by the second acoustic-optical element 122 is made incident upon the first correction mirror 170 and is deflected in the sub-scanning direction Y thereby. Further the red light beam reflected by the specimen 117 is further reflected by the first correction vibrating mirror 170 via the common vibrating mirror 113. Similarly, the blue light beam is reflected by the second correction mirror 171. It should be noted that the concave lenses 118, 128 and 140 provided in the embodiment shown in FIG. 12 are dispensed with.

Figure 15:
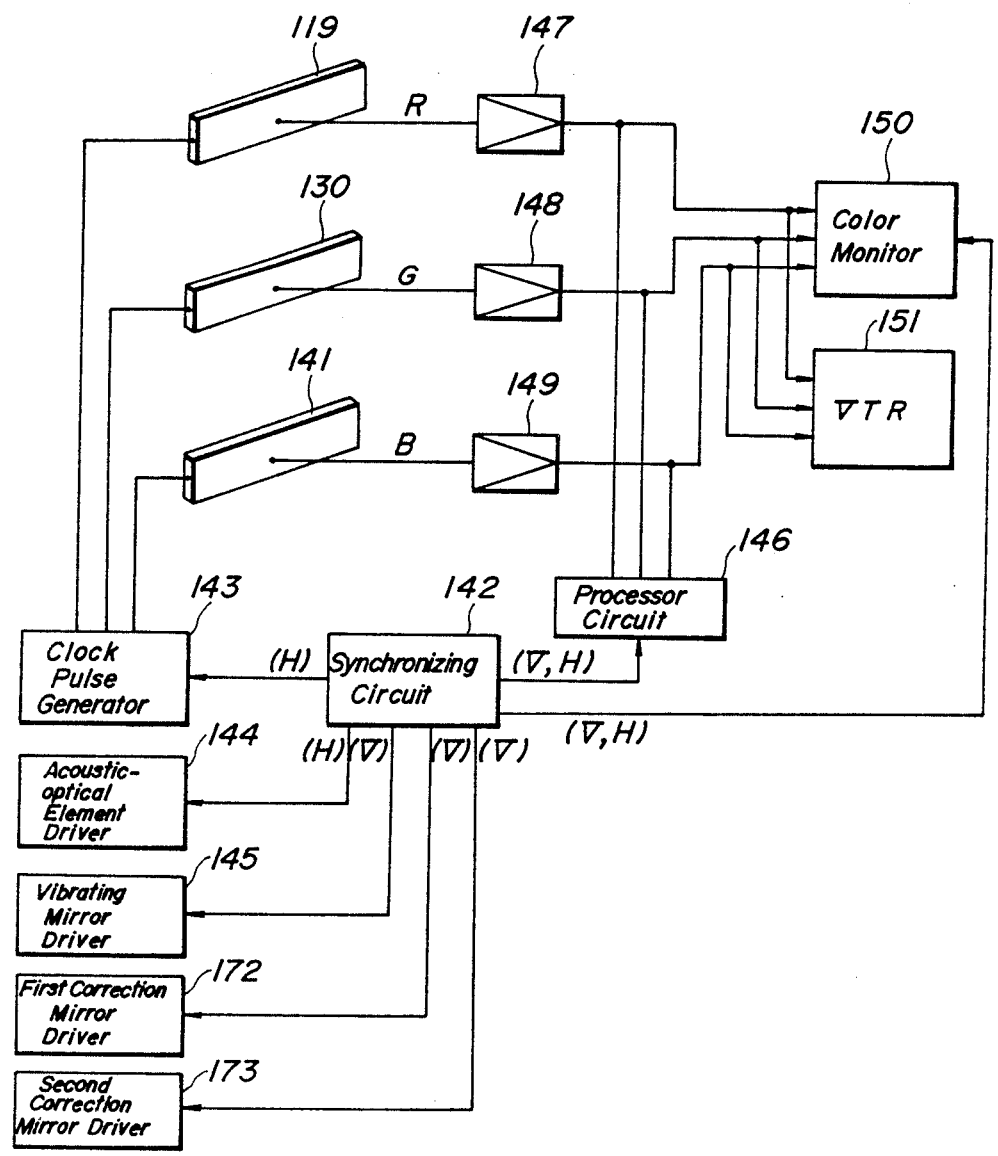
FIG. 15 is a block diagram showing an embodiment of a driving circuit of the apparatus illustrated in FIG. 14.

FIG. 15 is a block diagram showing a driving circuit of the above image pick-up apparatus illustrated in FIG. 14. Also portions similar to those shown in FIG. 13 are denoted by the same reference numerals used in FIG. 13. In the present embodiment, there are provided first correction mirror driving circuit 172 and second correction mirror driving circuit 173 which are controlled by the vertical scanning signal V supplied from the synchronizing circuit 142. The first and second correction mirror driving circuits 172 and 173 generate driving signals which are in synchronism with the driving signal for the common vibrating mirror 113.

Now the correcting operation will be explained also with reference to FIGS. 16 to 18. FIG. 16A shows scanning regions formed by the red, green and blue light beams on the specimen 117, and FIG. 16B illustrates red, green and blue images $I_R$, $I_G$ and $I_B$ of an image O in the specimen 117. In FIG. 16A, a solid line represents a scanning region $F_G$ of the green light beam, a broken line, a scanning region $F_R$ of the red light beam, and a chain line denotes a scanning region $F_B$ of the blue light beam. In the present example, the blue scanning region $F_G$ is larger than the green scanning region $F_B$ viewed in the vertical direction, and the red scanning region $F_R$ is smaller than the green scanning region $F_G$. Then, on the color monitor 150, the blue image $I_G$ is reproduced smaller than the green image $I_G$, and the red image $I_R$ is displayed larger than the green image $I_G$. In this manner, there is produced the color deviation in the vertical direction. In order to avoid the color deviation, the red and blue scanning regions $F_R$ and $F_B$ are adjusted to be identical with the green scanning region $F_G$ by controlling the driving signals for the first and second correction vibrating mirrors 170 and 171.

FIG. 17 illustrates deflection signals for the common vibrating mirror 113 and first and second correction vibrating mirrors 170 and 171. A signal a represents a waveform of the deflection signal for the common vibrating mirror 113, and signals b and c depict waveforms of the deflection signals for the first and second correction mirrors 170 and 171, respectively. The green light beam is used as the standard beam for the color deviation correction, and thus is deflected only by the common vibrating mirror 113 which is vibrated in accordance with the deflection signal waveform a. Since the red scanning region $F_R$ is smaller than the green scanning region $F_G$, the first correction mirror 170 is vibrated in accordance with the deflection signal waveform b which has the same phase as the common deflection signal a, so that the red light beam is deflected to a greater extent in the vertical direction and thus the red scanning region $F_R$ is made equal to the green scanning region $F_G$. Contrary to this, the second correction mirror 171 is vibrated in accordance with the deflection signal c having the opposite phase to that of the common deflection signal a, so that the deflection amount of the blue light beam in the vertical direction is decreased. In this manner, the red and blue scanning region $F_R$ and $F_B$ can be completely made identical with the green scanning region $F_G$. Therefore, the vertical heights of red and blue images $I_R$ and $I_B$ can be made equal to the vertical height of the green image $I_G$.

Figure 18A:
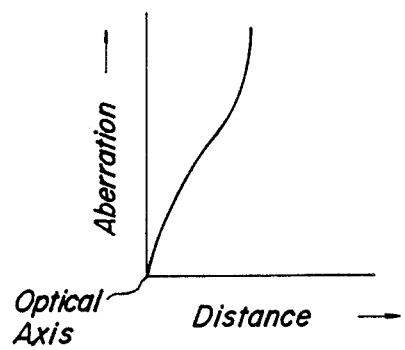
FIGS. 18A and 18B are graphs showing aberration and correcting signal.
Figure 18B:
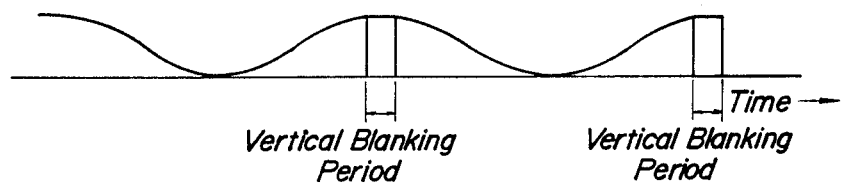

In the example so far explained, it is assumed that the chromatic aberration is increased linearly in accordance with the increase in a distance from the optical axis of objective lens. However, according to the invention, when the chromatic aberration appears non-linearly as illustrated in FIG. 18A, it is possible to correct the chromatic aberration by using a non-linear deflection signal illustrated in FIG. 18B.

Figure 19:
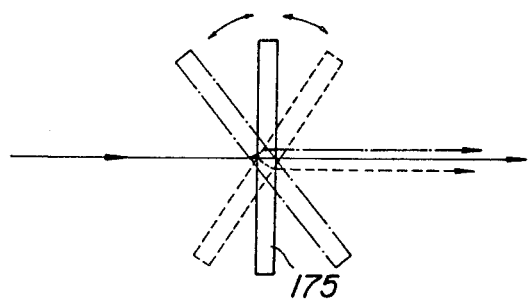
FIG. 19 is a schematic view illustrating another embodiment of an aberration correcting member.

FIG. 19 is a schematic view showing another embodiment of the chromatic aberration correcting device according to the invention. In this embodiment, use is made of a plane parallel plate 175 instead of the vibrating mirror. The plate 175 is arranged in the optical path movably about a shaft extending in the main-scanning direction X. Therefore, the light beam transmitted through is deviated from the optical axis as illustrated in FIG. 19 and an amount of the deviation is related to an inclination angle of the plane parallel plate 175. Thus, by rotating the plane parallel plate 175 in accordance with the correction signal similar to the deflection signal b or c in FIG. 17, it is possible to correct to chromatic aberration.

According to the invention, it is further possible to correct the chromatic aberration in the horizontal direction. As illustrated in FIG. 20a, the red, green and blue scanning frames $F_R$, $F_G$ and $F_B$ have different sizes in the horizontal direction due to the chromatic aberration of the objective lens. That is to say, when the red scanning region $F_R$ is smaller than the green scanning region $F_G$, a red image $M_R$ of an object O formed on the second linear image sensor 130 is smaller than a green image $M_G$ formed on the first linear image sensor 119, and then a red image $I_R$ reproduced on the color monitor 150 is smaller than a green image $I_G$. Since the blue scanning region $F_B$ is larger than the green scanning region $F_G$, a blue image $M_B$ formed on the third linear image sensor 141 becomes larger than the green image $M_G$, and therefore a blue image $I_B$ displayed on the color monitor 150 becomes larger than the green image $I_G$. In this manner, there occurs the color deviation in the horizontal direction. Such a color deviation may be compensated for the adjusting the positions of the linear image sensors along the optical axes or by moving the concave lenses provided in front of the linear image sensors as shown in FIG. 12. However, in such a case, the color images might not be correctly focused on the linear image sensors and thus the sharpness of color images is deteriorated.

In the present embodiment, the linear image sensors 119, 130 and 141 are arranged at in-focused positions and the readout frequencies of the linear image sensors are adjusted in accordance with the chromatic aberration so as to make identical the magnifications of respective color images with each other.

Figure 20C:
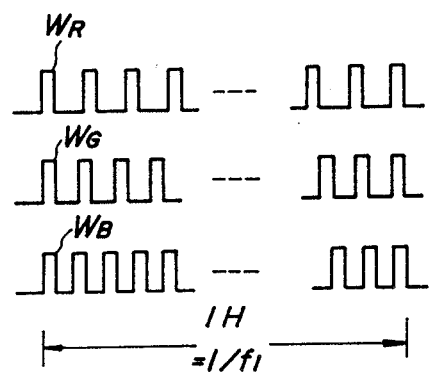
Figure 20D:
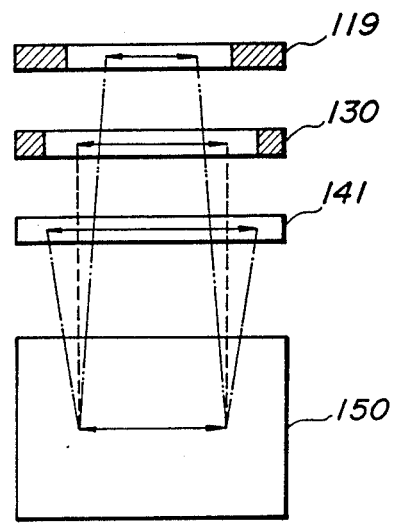

FIGS. 20C shows waveforms of the readout clock pulses $W_R$, $W_G$ and $W_B$ for the first, second and third linear image sensors 119, 130 and 141 of the color image pick-up apparatus shown in FIG. 12. When a horizontal dimension of the image formed on the linear image sensor is smaller than a standard value, the readout clock frequency is decreased, and when the image on the linear image sensor is larger than the standard image, the readout clock frequency is increased. In the present example, the first linear image sensor 119 is readout by the readout clock pulses $W_R$ having a frequency lower than that of the readout clock pulses $W_G$ of the second linear image sensor 130 which receives the standard color image, i.e. green image $M_G$. Further, the third linear image sensor 141 is readout by readout clock pulses $W_B$ having a frequency higher than that of the clock pulses $W_G$. Then, as illustrated in FIG. 20D, on the color monitor 150, there are reproduced red, green and blue images having the same horizontal dimension. In this manner, the color deviation in the horizontal direction due to the chromatic aberration of the objective lens can be simply and precisely corrected by adjusting the frequencies of the readout clock pulses for the linear image sensors, while the sharpness of the image can be remained high.

The frequencies of the readout clock pulses $W_R$, $W_G$ and $W_B$ for the linear image sensors 119, 130 and 141 can be adjusted manually by controlling adjusting members provided in the clock pulse generator 143. Moreover, the chromatic aberration is inherent to particular objective lenses, desired readout clock pulse frequencies for respective objective lenses have been previously stored in ROM and necessary data may be automatically readout of the ROM when an objective lens is replaced by another lens.

FIG. 21 is a block diagram showing another embodiment of the driving circuit by means of which the color deviation in the horizontal direction can be compensated for. In FIG. 21, portions similar to those shown in FIG. 15 are denoted by the same reference numerals used in FIG. 15. In the present embodiment, the first, second and third linear image sensors 119, 130 and 141 are readout by the same readout clock pulses in synchronism with each other. Then, red, green and blue color image signals R, G and B are stored in memories 176, 177 and 178, respectively via the amplifiers 147, 148 and 149 under the control of a write-in control circuit 179 which receives the horizontal synchronizing signal H from the synchronizing circuit 142. Then the red, green and blue signals are readout of the memories 176, 177 and 178 under the control of a readout control circuit 180 at different readout frequencies corresponding to the deviation in the horizontal direction. That is to say, the red color signal is readout slowly by the readout signal having a frequency $f_R$ lower than a frequency $f_G$ for reading out the green color signal, and the blue color signal is readout in accordance with a frequency $f_B$ higher than $f_G$. It should be noted that readout timings at the memories 176, 177 and 178 are so determined that center points of respective color images are readout simultaneously. Therefore, the number of memory stages which are actually readout is different for respective memories 176, 177 and 178. Then, the red, green and blue color signals are reproduced on the color monitor 150 and recorded by the video tape recorder 151 in the same manner as that explained above with reference to FIG. 15. Each memory may be formed by a pair of line memories or a frame memory.

In the color image pick-up apparatus according to the invention, it is also possible to remove any deviation of image in the horizontal direction due to alignment error and aberrations other than the chromatic aberration. Even if the distortion due to the chromatic aberration is corrected, the image might be distorted in the horizontal direction due to various causes. For instance, if the mirrors and lenses are not aligned correctly, the image is deformed in various shapes. According to the invention, such image distortion can be effectively corrected by suitably adjusting the readout frequency of the linear image sensor.

FIG. 22A illustrates a raster image reproduced or the monitor, which is subjected to a so-called barrel distortion. Such a distortion appears when a central portion is expanded and upper and lower portions are reduced in the horizontal direction. Then, the readout clock frequency is changed in such a manner that the frequency is lower in the upper and lower portions and becomes higher in the central portion as illustrated in FIG. 22B. To this end, in the embodiment shown in FIG. 15 the horizontal and vertical synchronizing signals H and V are supplied from the synchronizing circuit 142 to the clock pulse generator 143 so that the clock pulse generator 143 generates the readout clock pulses having the frequency which varies in synchronism with the vertical synchronizing signal V. Then the distortion can be corrected as shown in FIG. 22C. In the embodiment illustrated in FIG. 21, the same correction can be effected by varying the frequency of the readout signal supplied from the readout control circuit 180.

Figure 23A:
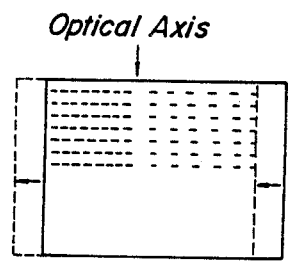
FIGS. 23A and 23B are a schematic view and signal waveform for explaining how to correct a distortion in the horizontal direction.
Figure 23B:
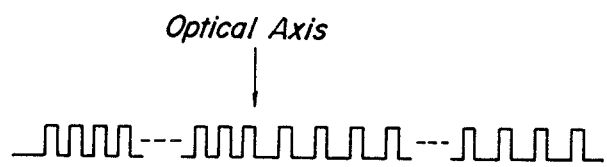

FIG. 23A shows another example of the deviation in which the magnification is decreased in the right half portion and is increased in the left half portion. Such a deviation may be produced when the mirror is not correctly arranged with respect to the optical axis. In order to remove such a deviation, the readout frequency at the linear image sensor is increased in the left hafl portion, and is decreased in the right half portion as illustrated in FIG. 23B. When the deviation due to the variation of the magnification in the horizontal direction is compensated for, the accuracy in dimension of the image displayed on the monitor is improved. This is particularly advantageous when dimensions of IC pattern are measured on the basis of the image reproduced on the monitor.

Figure 24A:
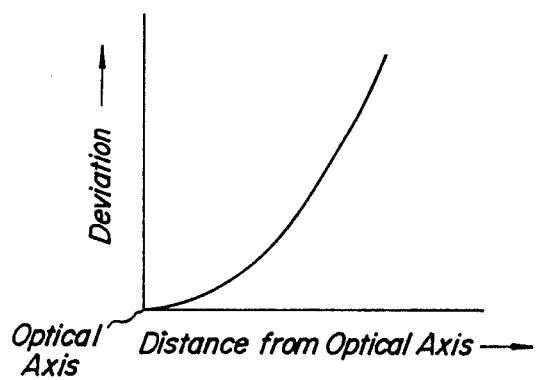
FIGS. 24A and 24B are graphs showing how to correct a non-linear distortion.
Figure 24B:
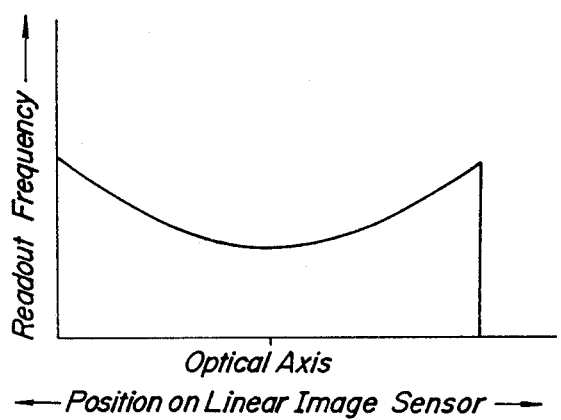

FIG. 24A shows still another example of the distortion. In the present example, the distortion appears non-linearly. In this case, when the readout frequency at the linear image sensor is varied non-linearly as illustrated in FIG. 24B, the distortion can be corrected effectively.

It should be noted that the correcting methods explained above with reference to FIGS. 23 and 24 may be equally adopted by changing the readout frequency for the memory in the embodiment shown in FIG. 21. Further, the above mentioned principle of correcting the distortion can be equally applied to the monochromatic image pick-up apparatus using a single light beam.

Figure 25:
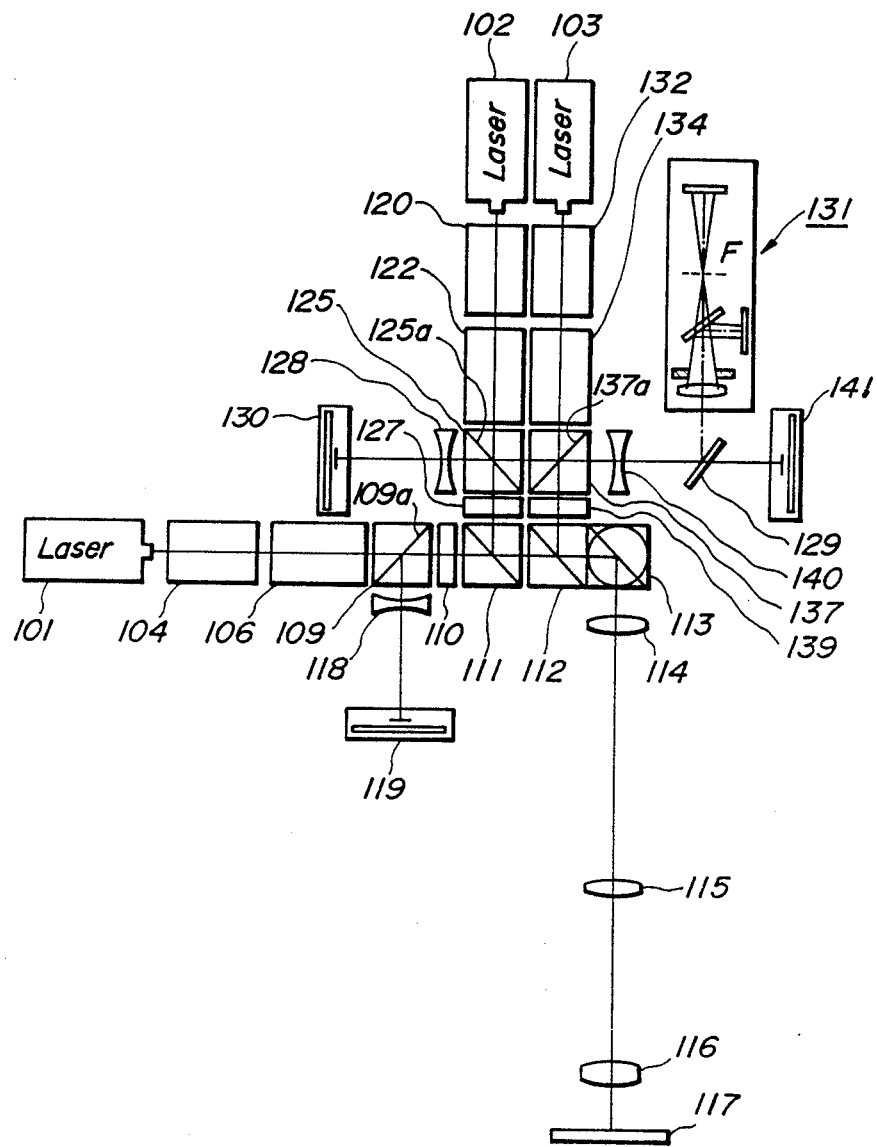
FIG. 25 is a schematic view illustrating still another embodiment of the color image pick-up apparatus according to the invention.

FIG. 25 is a schematic view depicting another embodiment of the image pick-up apparatus according to the invention. In FIG. 25 portions similar to those shown in FIG. 12 are denoted by the same reference numerals used in FIG. 12. Upon comparing the present embodiment with the embodiment shown in FIG. 12, it is apparent that various optical elements are arranged closely to each other and thus the whole apparatus can be constructed in a compact manner. That is to say, in the present embodiment, the common deflecting mirror 113 is arranged immediately after the acoustic-optical elements 106, 122 and 134, so that the relay lenses 107, 108, 123, 124, 135 and 136 illustrated in FIG. 12 are dispensed with.

Figure 26:
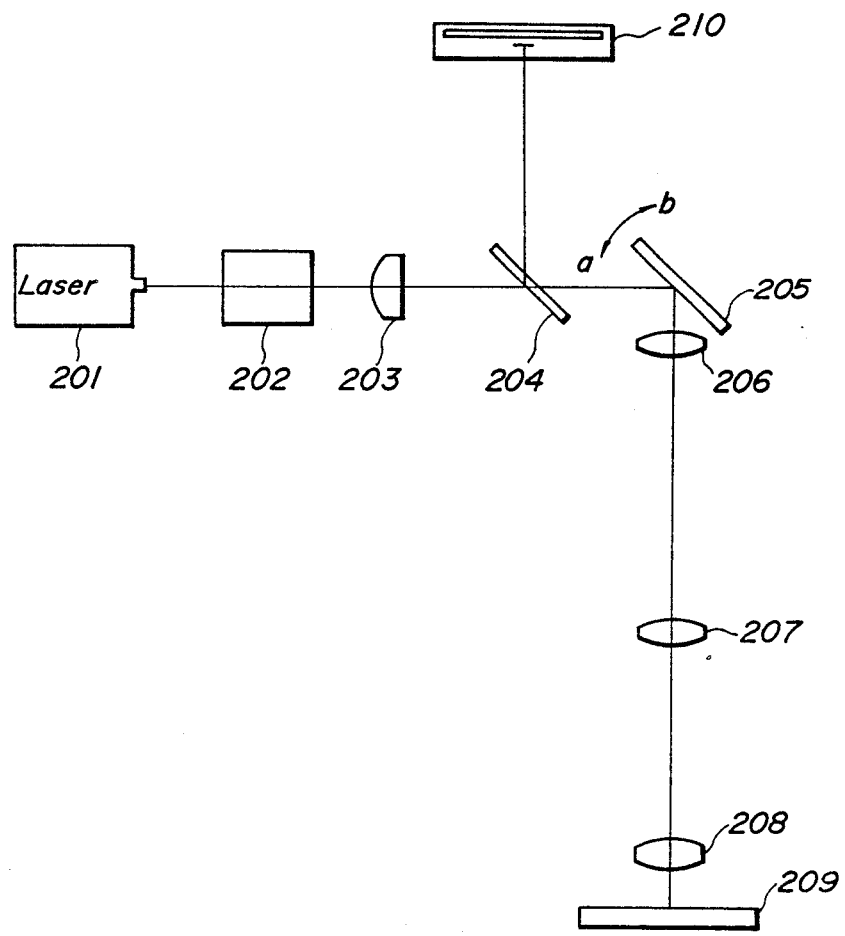
FIG. 26 is a schematic view showing an embodiment of the image pick-up apparatus according to the invention using a cylindrical lens.

FIG. 26 is a schematic view illustrating another embodiment of the image pick-up apparatus according to the invention. In the embodiments so far explained, the main-scanning is effected by means of the acoustic-optical element which deflects the light beam in the main-scanning direction X. However, such an acoustic-optical element is expensive and thus the whole apparatus becomes expensive. Particularly, in the color image pick-up apparatus, there are provided three acoustic-optical elements, the apparatus is liable to become expensive. Moreover, in the acoustic-optical element, even if an incident angle is changed only slightly, the light beam could not be deflected correctly. Therefore, the adjustment of the acoustic-optical element is very cumbersome. In the embodiment shown in FIG. 26, a light beam emitted from a laser light source 201 is extended into a parallel beam by means of an expander 202 and then is made incident upon a cylindrical lens 203 which converges the light beam only in the sub-scanning direction Y parallel to the plane of the drawing of FIG. 26. Therefore, after passing through the cylindrical lens 203, a very thin rectilinear light beam extending in the main-scanning direction X can be obtained. This light beam is transmitted through a half mirror 204 and is made incident upon a vibrating mirror 205 swinging in directions a and b. Therefore the light beam is deflected in the sub-scanning direction Y at a constant frequency corresponding to the vertical scanning frequency. The rectilinear light beam thus deflected is then made incident upon an objective lens 208 via imaging leans 206 and relay lens 207 and is focused onto a specimen 209 as a very thin rectilinear light spot. In this manner, the speciment 209 is scanned two-dimensionally by the rectilinear light beam.

Figure 27:
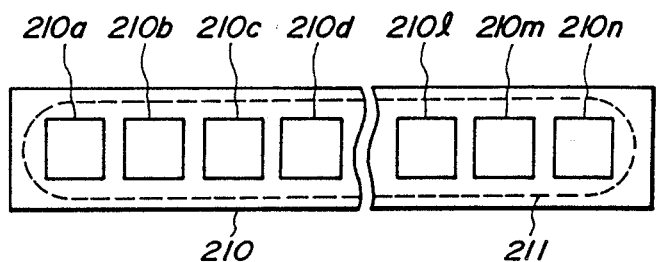
FIG. 27 is a plan view depicting a positional relation between a rectilinear beam spot and photoelecric converting elements.

A light flux reflected by the specimen 209 is corrected by the objective lens 208 and is reflected by the vibrating mirror 205 via the lenses 207 and 206. Further, the light beam reflected by the vibrating mirror 205 is made incident upon a linear image sensor 210 via the half mirror 204. The linear image sensor 210 is arranged at a focal point of the imaging lens 206 and comprises a number of photoelectirc converting elements aligned in the main-scanning direction X. That is to say, a rectilinear light spot 211 is projected on photoelectric converting element 210a, 210b ... 210n of the linear image sensor 210 as illustrated in FIG. 27. Then, the linear image sensor 210 is readout at a readout frequency related to the horizontal synchronizing frequency to derive an image signal. In the present embodiment, since the rectilinear light spot 211 extending in the main-scanning direction is scanned by the linear image sensor 210, the main-scanning can be performed precisely without being affected by mechanical fluctuation in the main-scanning direction and thus, a very sharp image can be obtained.

Figure 28:
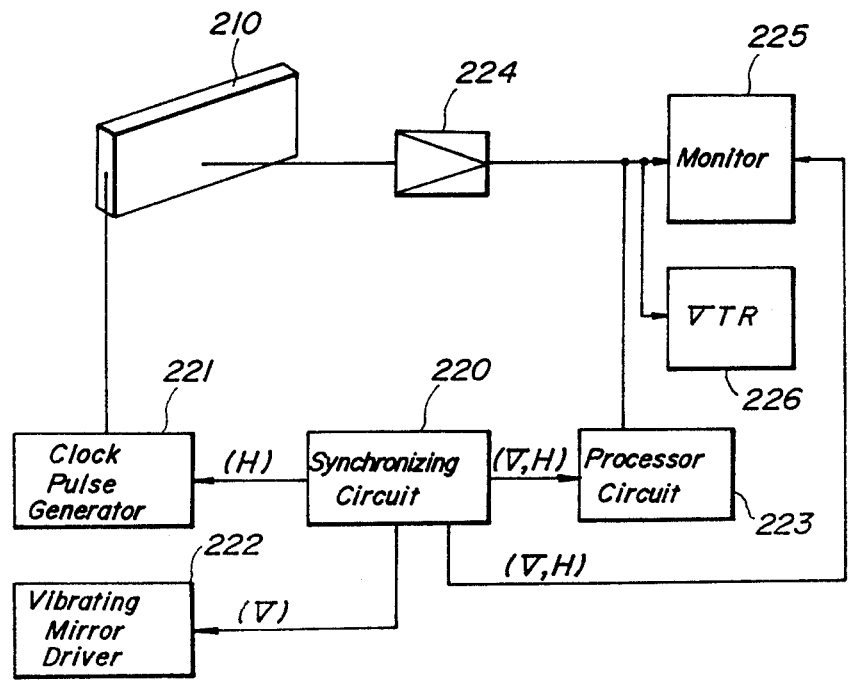
FIG. 28 is a block diagram illustrating a driving circuit of the apparatus shown in FIG. 26.

FIG. 28 is a block diagram showing an embodiment of a driving circuit of the image pick-up apparatus. There is provided a synchronizing circuit 220 for generating horizontal and vertical synchronizing signals H and V. The horizontal synchronizing signal H is supplied to a clock pulse generator 221 to produce readout clock pulses having a repetition frequency $F_c = N \cdot f_H$, wherein N is the number of the photoelectric converting elements 210a, 210b ... 210n of the linear image sensor 210 and $f_H$ is a frequency of the horizontal synchronizing signal H. Therefore, each photoelectric converting element is scanned at the period of the horizontal synchronizing signal H. The vertical synchronizing signal V is supplied to a vibrating mirror driving circuit 222 to generate a driving signal by means of which the mirror 205 is vibrated periodically at the rhythm of the vertical synchronizing frequency $f_v$. A photoelectric output signal readout of the linear image sensor 210 is amplified by an amplifier 224 and then is supplied to a monitor 225 and video tape recorder 226 after the horizontal and vertical synchronizing signals H and V being added thereto by means of a processor circuit 223.

Figure 29:
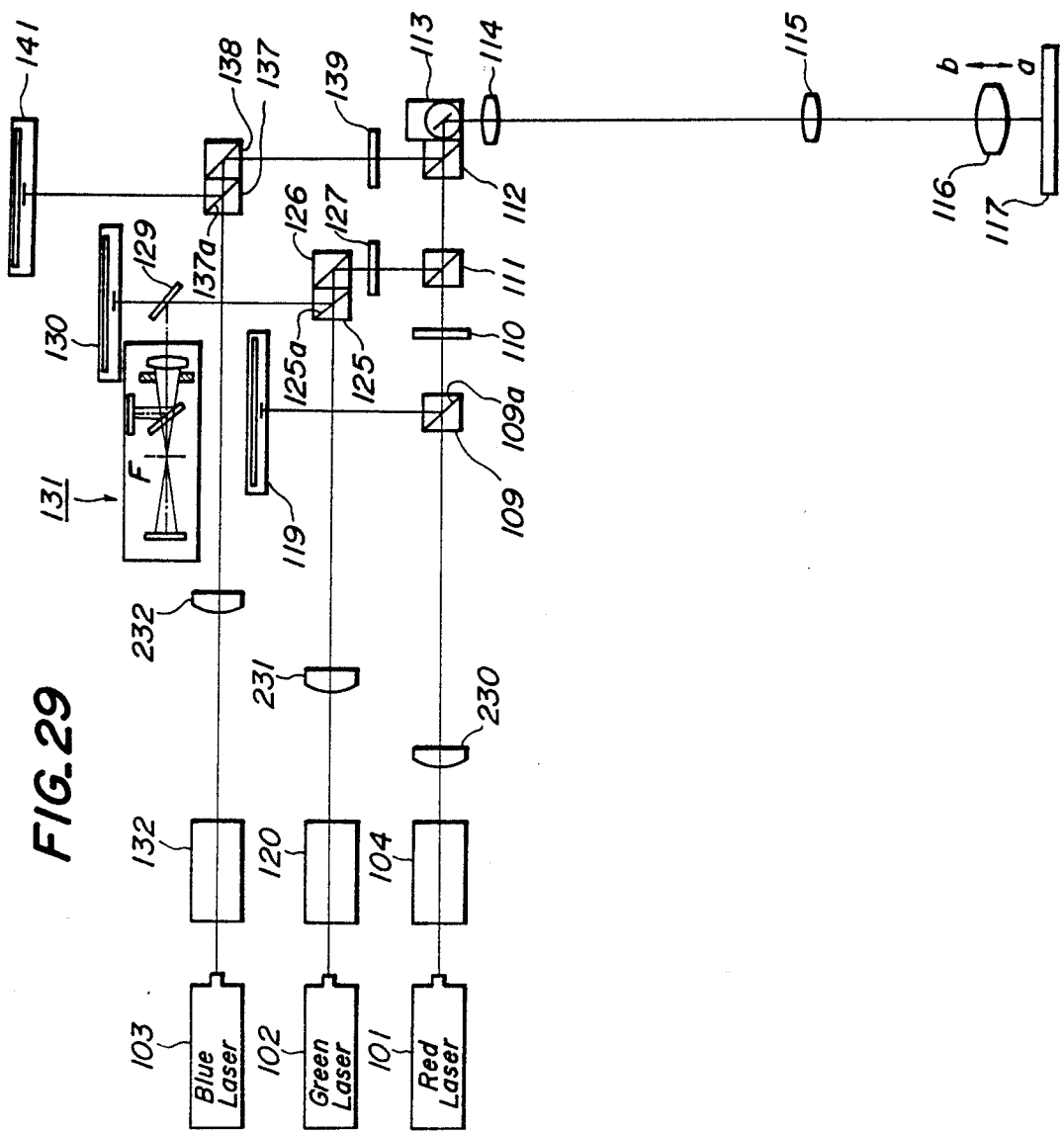
FIG. 29 is a schematic view showing an embodiment of the color image pick-up apparatus according to the invention using cylindrical lenses.

FIG. 29 is a schematic view showing another embodiment of the color image pick-up apparatus according to the invention. In FIG. 29, portions similar to those shown in FIG. 12 are represented by the same reference numerals as those used in FIG. 12. In the present embodiment, first, second and third cylindrical lenses 230, 231, 232 are arranged between expanders 104, 120, 132 and polarization prisms 109, 125, 137, respectively so as to form red, green and blue rectilinear light beams extending in the main-scanning direction X perpendicular to the plane of the drawing of FIG. 29. These rectilinear light beams are made incident upon the vibrating mirror 113 by means of the common optical path, and the vibrating mirror 113 is swung at the vertical synchronizing frequency $f_V$ to deflect the light beams in the sub-scanning direction Y perpendicular to the main-scanning direction X. After the light beams reflected by the specimen 117 are deflected again by the vibrating mirror 113, they are made incident upon the linear image sensors 119, 130 and 141 as rectilinear light spots. Then, the linear image sensors 119, 130 and 141 are readout in synchronism with each other at a period of the horizontal synchronizing signal to derive red, green and blue color image signals.

In the embodiments using the cylindrical lens illustrated in FIGS. 26 and 29, the resolution of the image in the horizontal direction is slightly lowered as compared with the embodiments using the acoustic-optical element, but the resolution in the vertical direction is still high. Further, the light beam is converged in the main-scanning direction, it is possible to form the rectilinear light spot having high intensity upon the linear image sensor, and thus the image signal having high S/N can be obtained.

Figure 30:
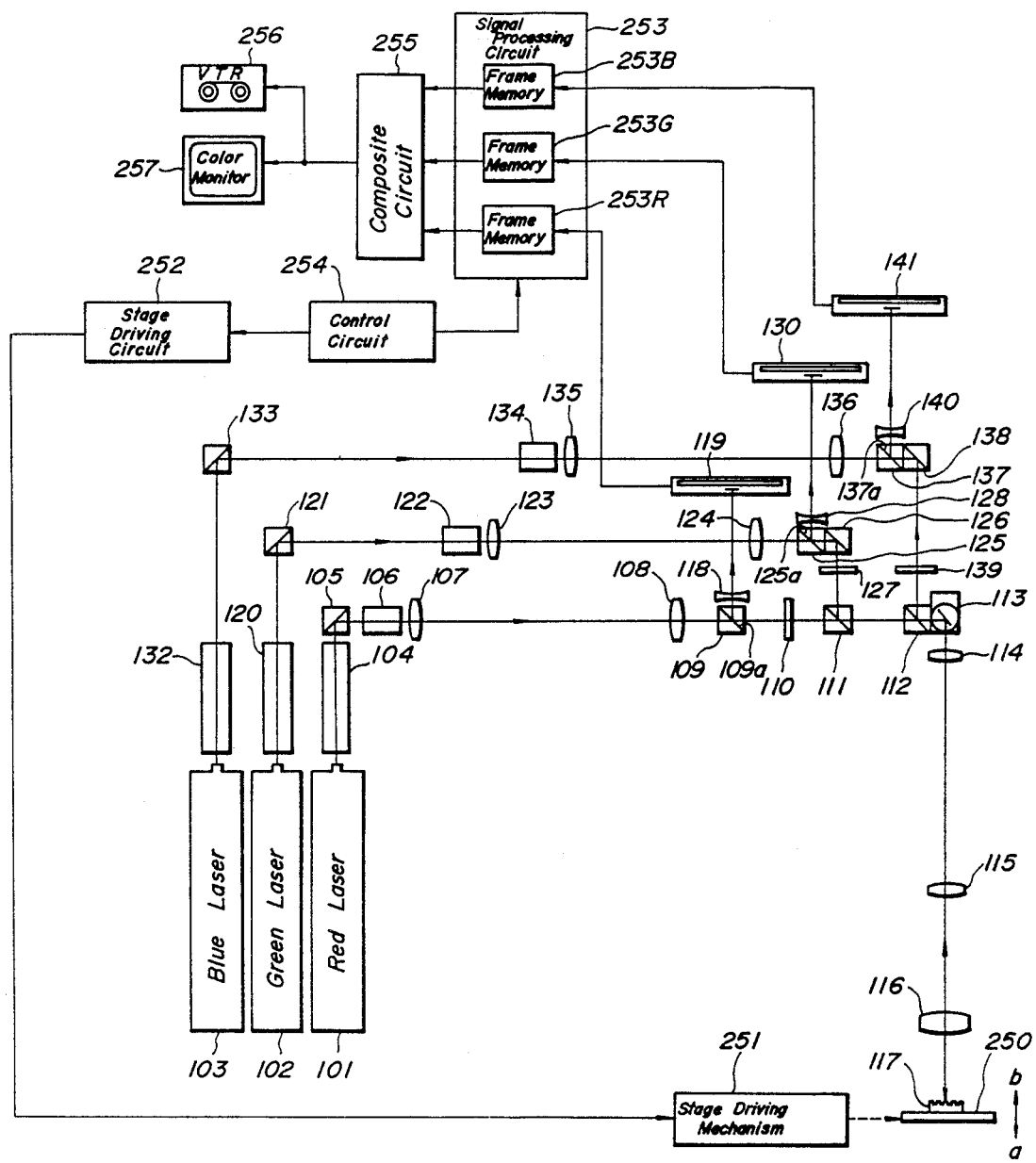
FIG. 30 is a schematic view showing still another embodiment of the color image pick-up apparatus according to the invention.

FIG. 30 is a schematic view showing still another embodiment of the image pick-up apparatus according to the invention. In case of taking macrophotographs of tiny insects and flowers by using usual still camera or television camera, it is impossible to obtain an image in which all parts of object are focused sharply. In order to expand an in-focus region, it is effective to increase a focal depth of an objective lens. However, in such a case, the resolution might be reduced, and if the object has a large size in the optical axis direction, the whole object could not be focused sharply.

In order to avoid such a drawback, there has been developed a light scanning camera in which a very thin light screen is formed at right angles to an optical axis of an objective lens which is adjusted to be focused at the light screen. Then, the object is moved along the optical axis through the light screen, while a shutter of the camera is remained opened. In this manner, sharp images of the object portions which pass through the light screen are successively formed on a photographic film to obtain a photograph in which all parts of the object are sharply focused. Such a photograph is resembled to a photograph taken by a scanning type electron microscope, but when a color film is used, it is possible to obtain a color image.

However, in the known light scanning camera, it is very difficult to form the very thin light screen having high intensity. Therefore, there is a drawback that it takes a long period such as one minute for taking a single photograph. Moreover, in the light scanning camera, since the thickness of the light screen could not be made thin in the order of micron, it is impossible to form a sharp image of a crenellated construction of a semiconductor chip. In the embodiment shown in FIG. 30, it is possible to take a very sharp image of an object over its whole depth. The optical system of the color image pick-up apparatus shown in FIG. 30 is substantially same as that illustrated in FIG. 12, and portions similar to those shown in FIG. 12 are denoted by the same reference numerals used in FIG. 12. In the present embodiment, the specimen 117 is placed on a stage 250 arranged movably in the optical axis direction of the objective lens 116 as shown by arrows A and B. The stage 250 is driven by a stage driving mechanism 251 which is controlled by a stage driving circuit 252. There is further provided a signal processing circuit 253 comprising red, green and blue frame memories 253R, 253G and 253G. The stage driving circuit 252 and signal processing circuit 253 are controlled by a control circuit 254. After the red, green and blue image signals are suitably processed in the signal processing circuit 253, the image signals are supplied to a composite circuit 255 to form a color television signal which is then recorded by a video tape recorder 256 and is displayed on a color monitor 257.

FIG. 31 is a block diagram illustrating an embodiment of a driving circuit for the linear image sensors and the signal processing circuit 253. The driving circuit comprises synchronizing circuit 258 generating horizontal and vertical synchronizing signals H and V, clock pulse generator 259 for generating readout clock pulses having a repetition period equal to that of a product of the number of photoelectric converting element N and horizontal synchronizing frequency $f_H$, acoustic-optical element driving circuit 260 for producing a driving signal for the acoustic-optical elements 106, 122 and 134, and vibrating mirror driving circuit 261 for generating a driving signal for the vibrating mirror 113 in synchronism with the vertical synchronizing signal V. In the present embodiment, the acoustic-optical elements 106, 122 and 134 are driven in synchronism with the horizontal synchronizing signal V. But, as explained above, they may be driven at a frequency higher than that of the horizontal synchronizing signal.

The red, green and blue image signals readout of the linear image sensors 119, 131 and 141 are amplified by amplifiers 262, 263 and 264 and are then converted into digital signals by A/D converters 265, 266 and 267. The digital image signals are then supplied to operation circuits 268, 269 and 270 provided in the signal processing circuit 253. In the present embodiment, the simplest operation is performed for the color image signals in the signal processing circuit 253. At first, the stage 250 is set into an initial position and the red, green and blue light beams are deflected two-dimensionally by means of the acoustic-optical elements 106, 122 and 134 and vibrating mirror 113 to form red, green and blue rasters on a scanning plane situating at the focal point of the objective lens 116. At the same time, the stage 250 is moved along the optical axis at a speed sufficiently lower than the vertical scanning speed. During the vibrating mirror 113 is swung by one period, the color image signals of one field are supplied to the operation circuits 268, 269 and 270 via the amplifiers 262, 263 and 264 and then are stored in the frame memories 253R, 253G and 253B, respectively. Next, after the stage 250 has been moved over a very small distance along the optical axis of the objective lens 116, the color image signals of a next field are supplied to the operation circuits 268, 269 and 270 to which the image signals stored in the frame memories 253R, 253G and 253B are also readout. In the operation circuits these color image signals are added to each other and color image signals thus summed are again stored in the frame memories 253R, 253G and 253B. The same signal processing is carried out successively, while the stage 250 is moved gradually in the optical axis direction. Finally, in the frame memories 253R, 253G and 253B there are obtained the color image signals summed up for many fields. Then, the color image signals stored in the frame memories are readout and a color image is reproduced on the color monitor 257. When it is required to form a hard copy, the image displayed on the monitor 257 is photographed by a still camera 271.

In the image pick-up apparatus according to the invention, since the light beam is deflected two-dimensionally and is focused as a very fine spot on the scanning plane, a portion of the specimen situating in the scanning plane is illuminated brightly, but a portion out of the scanning plane is not illuminated and thus is remained dark. Therefore, when the specimen is moved with respect to the scanning plane, sharp images of portions of the specimen are successively formed on the linear image sensor. Particularly, when the magnification of the objective lens is high, a very sharp and bright image of the specimen can be obtained, because portions other than the scanning plane become very dark.

It should be noted that the operation in the operation circuits 268, 269 and 270 is not limited to the additive operation, but may be modified. For instance, it is possible to store the maximum values in the frame memories 253R, 253G and 253B. This can be effected simply by comparing input image signals with the previously stored image signals and the latter image signals are replaced by the input signals only when the input signals are larger than the stored signals. Further, in the operation circuits 268, 269 and 270, various interpolations may be effected so as to obtain optimum images corresponding to respective objects.

Moreover, it is not always necessary to move the stage 250 at a constant speed. For instance, when a dark portion of the object is to be picked-up, the stage is moved slowly, while in a bright area the stage is driven at a higher speed. Then, it is possible to obtain an image having a uniform brightness.

The present invention is not limited to the embodiments explained above, but many modifications and alternations may be conceived by those skilled in the art within the scope of the invention. For instance, in the above embodiments, the vibrating mirror is driven at the vertical scanning frequency, but when a memory is used for storing the image signal readout of the linear image sensor, the vibrating mirror may be swung at a frequency higher than the vertical scanning frequency.

Further, the vibrating mirror may be replaced by a polygonal mirror arranged rotatably. In the color image pick-up apparatuses, there are provided three acoustic-optical elements for deflecting the red, green and blue light beams in the main-scanning direction. It is also possible to deflect the three light beams by means of a single acoustic-optical element. In this case, the three light beams are made incident upon the acoustic-optical element at different incident angles in the same plane or different planes. In case of using the single acoustic-optical element, there must be provided an optical system for making incident the three beams deflected into different directions upon the common vibrating mirror, but the number of expensive acoustic-optical elements can be minimized and thus the whole apparatus can be less expensive.

Further, in the embodiment shown in FIG. 30, the optical system including the objective lens may be moved in the optical axis direction with respect to the stage arranged stationary.

In the embodiments so far explained, the light source comprises the laser, but it may be formed by other light sources such as incandescent lamp and high pressure mercury discharge lamp. In such a case, it is possible to perform the fluorescent observation by providing a filter for selectively cutting off the visual light rays in front of the light source.

The advantageous effects of the image pick-up apparatus according to the invention can be summarized as follows.

(1) In case of using the deflection element for deflecting the light beam in the main-scanning direction, since the specimen is scanned by the light beam spot and the linear image sensor has a charge accumulating function, it is possible to obtain the image signal having high S/N and resolution. Further, the scanning light source can be made small in size.

(2) Since the pixels of the specimen are always related to the photoelectric converting elements of the linear image sensor, even if the scanning speed of the light beam in the horizontal direction is varied, it is possible to reproduce the distortion free image.

(3) Since the shading due to the lenses and mirrors can be easily corrected by electrical or mechanical means owing to the fact that the specimen image is precisely corresponded with the photoelectric converting elements of the linear image sensor, it is possible to obtain the specimen image having uniform brightness.

(4) When the main scanning frequency is made higher than the readout frequency of the linear image sensor, the scanning line density can be equivalently increased without decreasing the scanning speed, and therefore the optical information of the specimen can be reproduced accurately. Particularly, since the linear image sensor having more than a thousand photoelectric converting elements can be obtained easily, the image signal having high resolution can be derived easily.

(5) When the light source is formed by a laser emitting a coherent light beam, there is produced an interference phenomena due to the crenellated construction of the specimen surface.

(6) In case of inspecting a living specimen, a small amount of fluorescent component contained therein can be excited with the laser light beam to emit fluorescent light which can be detected by the linear image sensor.

What is claimed is:

1. An image pick-up apparatus comprising:
   a light source unit including at least one light source for emitting a light beam;
   a first deflecting means for deflecting said light beam in a main-scanning direction at a main-scanning frequency;
   a second deflecting means for deflecting the light beam deflected by said first deflecting means in a sub-scanning direction substantially perpendicular to the main-scanning direction at a sub-scanning frequency;
   a lens means for focusing the light beam deflected by said second deflecting means onto a specimen and collecting and directing a light flux reflected by the specimen onto said second deflecting means;
   a light detector unit including at least one linear image sensor arranged at a focal plane of said lens means and having a plurality of photoelectric converting elements aligned linearly in the main-scanning direction; and
   means for reading out photoelectric charges stored in the photoelectric converting elements of the linear image sensor at a read-out frequency.

2. An apparatus according to claim 1, wherein said read-out frequency is independent of said main-scanning frequency.

3. An apparatus according to claim 1, wherein said first deflecting means is operated at the main-scanning frequency which is equal to a readout frequency at the linear image sensor.

4. An apparatus according to claim 1, wherein said first deflecting means is operating at the main-scanning frequency which is higher than a readout frequency at the linear image sensor.

5. An apparatus according to claim 4, wherein said main-scanning frequency is equal to a product of the readout frequency and an integer number larger than 1.

6. An apparatus according to claim 1, further comprising a relay lens system arranged between the first deflection means and the lens.

7. An apparatus according to claim 1, wherein a size of a beam spot projected on the linear image sensor is slightly larger than a light receiving aperture of a photoelectric converting element of the linear image sensor.

8. An apparatus according to claim 1, further comprising a focus detection means for detecting a focus condition of the lens by receiving a part of the light beam directed to the linear image sensor.

9. An apparatus according to claim 1, wherein said light source is formed by a laser light source.

10. An apparatus according to claim 1, wherein said first deflection means comprises an acoustic-optical element.

11. An apparatus according to claim 1, wherein said second deflection means comprises a vibrating mirror.

12. An apparatus according to claim 1, wherein said second deflection means comprises a rotating polygonal mirror.

13. An apparatus according to claim 1, wherein said light source unit comprises red, green and blue light sources for emitting red, green and blue light beams and said light detector unit comprises three linear image sensors for receiving red, green and blue light beams, respectively, and the apparatus further comprising an optical system for introducing the red, green and blue light beams into a common optical path arranged between the first and second deflection means 14. An apparatus according to claim 13, wherein said optical system comprises first and second dichroic mirrors arranged in a optical path of one light beam.

15. An apparatus according to claim 13, further comprising a focus detection device for detecting a focus condition of the lens by means of a part of one light beam directed toward one linear image sensor.

16. An apparatus according to claim 13, wherein said optical system comprises at least two concave lenses arranged moveably along optical paths of at least two light beams for adjusting size of raster images projected onto the linear image sensors related to said at least two light beams.

17. An apparatus according to claim 13, further comprising at least two third deflection means for deflecting at least two light beams in the sub-scanning direction in synchronism with the second deflection means such that any deviation of the raster in the sub-scanning direction can be compensated for.

18. An apparatus according to claim 17, wherein said third deflection means is driven linearly.

19. An apparatus according to claim 17, wherein said third deflection means is driven non-linearly.

20. An apparatus according to claim 17, wherein said third deflection means comprises a vibrating means.

21. An apparatus according to claim 17, wherein said third deflection means comprises a plane parallel plate arranged rotatably about a shaft extending in the main-scanning direction.

22. An apparatus according to claim 13, wherein at least two readout frequencies of at least two linear image sensors are adjustable such that any deviation in the main-scanning direction between red, green and blue rasters can be compensated for.

23. An apparatus according to claim 13, wherein said reading out means comprises three memories for storing image signals readout of the three linear image sensors, respectively, a write-in control circuit for controlling write-in operation at the three memories, and a readout control circuit for controlling reading out operation at the three memories.

24. An apparatus according to claim 23, wherein readout frequencies of at least two memories are adjustable such that any deviation in the main-scanning direction between red, green and blue rasters can be compensated for.

25. An apparatus according to claim 24, wherein said readout frequency is changed linearly.

26. An apparatus according to claim 24, wherein said readout frequency is changed non-linearly.

27. An apparatus according to claim 23, wherein a readout frequency of at least one memory is adjusted such that any deviation of a raster in the sub-scanning direction can be compensated for.

28. An apparatus according to claim 1, further comprising a stage for supporting the specimen, means for moving the stage relative to the lens in its optical axis direction, and a signal processing circuit including a frame memory for storing the image signal readout of the linear image sensor.

29. An apparatus according to claim 28, wherein said signal processing circuit derives a sum of the image signals readout of respective photoelectirc converting elements of the linear image sensor.

30. An apparatus according to claim 28, wherein the stage is moved at a constant speed.

31. An apparatus according to claim 28, wherein the stage is moved at a varying speed.

32. An apparatus according to claim 1, wherein said second deflection means is arranged immediately after said first deflection means.

33. An apparatus according to claim 1, wherein said raster projecting means comprises an expander for expanding the light beam emitted from the light source, a cylindrical lens for converging the expanded light beam only in the sub-scanning direction to form a rectilinear light beam, a vibrating mirror for deflecting the converged light beam in the sub-scanning direction, and a lens for focusing the deflected light beam on the specimen as a rectilinear light spot.

34. An apparatus according to claim 33, wherein said light source unit comprises red, green and blue light sources emitting red, green and blue light beams, respectively, and said raster projecting means comprises three pairs of expander and cylindrical lens, each being arranged in respective red, green and blue optical paths, an optical system for introducing the red, green and blue light beams into a common optical path, and a single vibrating mirror arranged to receive the red, green and blue light beams propagating along the common optical path and to deflect the red, green and blue light beams in the sub-scanning direction.

35. An apparatus according to claim 1, wherein said lens collects a light flux reflected by the specimen and the apparatus further comprises
an optical system for directing the light beam emanating from the objective lens and deflected by said second deflection means onto the linear image sensor.

36. An apparatus according to claim 35, wherein said optical system comprises a half mirror arranged between the first and second deflection means.

37. An apparatus according to claim 35, wherein said optical system comprises polarization element and quarter wavelength plate arranged between the first and second deflection means.

38. An apparatus according to claim 8, further comprising an objective lens for collecting a light flux transmitted through the specimen, a third deflection means for deflecting a light beam emanating from the objective lens in the sub-scanning direction in synchronism with the second deflection means, and an optical system for directing the light beam deflected by the third deflection means onto the linear image sensor.

39. An apparatus according to claim 38, wherein said second and third deflection means comprise reflection surfaces formed on front and rear surfaces of a plate which is swung about a shaft extending in the sub-scanning direction.

40. An apparatus according to claim 39, wherein said plate assumes first and second positions perpendicular to each other, and the apparatus further comprises an optical path switching element which assumes first and second positions, when the plate and optical path switching element are in the first positions, the light beam deflected by the first and second deflection means is projected onto the specimen and a light flux reflected by the specimen is collected by the objective lens is projected on to the linear image sensor via the second deflection means and optical path switching element to effect a reflection type inspection, and when said plate and optical path switching element are in the second positions, the light beam deflected by the first and second deflection means is projected upon the specimen by means of a condenser lens and a light flux transmitted through the specimen is collected by the objective lens and is projected onto said linear image sensor via the third deflection means and optical path switching element to effect a transmission type inspection.

41. An apparatus according to claim 40, further comprising an optical system for reversing right and left arranged in an optical path between the plate and condenser lens.

42. An image pick-up apparatus comprising:
a light source unit including at least one light source for emitting a light beam;
a first deflecting means for deflecting said light beam in a main-scanning direction at a main-scanning frequency;
a second deflecting means for deflecting the light beam deflected by said first deflecting means in a sub-scanning direction substantially perpendicular to the main-scanning direction at a sub-scanning frequency;
a first lens means for focusing the light beam deflected by said second deflecting means onto a specimen;
a second lens means for collecting a light flux transmitted through the specimen;
a third deflecting means for deflecting a light flux emanating from said second lens means in the sub-scanning direction at the sub-scanning frequency in synchronism with said second deflecting means;
a light detector unit including at least one linear image sensor arranged on a focal plane of said second lens means and having a plurality of photoelectric converting elements aligned linearly in the main-scanning direction; and
means for reading out photoelectric charges stored in the photoelectric converting elements of the linear image sensor at a read-out frequency.

43. An apparatus according to claim 42, wherein said read-out frequency is independent of said main-scanning frequency.

44. An apparatus according to claim 42, wherein said first deflecting means is operated at the main-scanning frequency which is equal to a readout frequency at the linear image sensor.

45. An apparatus according to claim 42, wherein said first deflecting means is operated at the main-scanning frequency which is higher than a readout frequency at the linear image sensor.

46. An apparatus according to claim 45, wherein said main-scanning frequency is equal to a product of the readout frequency and an integer number larger than 1.

47. An apparatus according to claim 42, further comprising a relay lens system arranged between the first deflection means and the first lens means.

48. An apparatus according to claim 42, wherein a size of a beam spot projected on the linear image sensor is slightly larger than a light receiving aperture of a photoelectric converting element of the linear image sensor.

49. An apparatus according to claim 42, wherein said light source is formed by a laser light source.

50. An apparatus according to claim 42, wherein said first deflection means comprises an acoustic-optical element.

51. An apparatus according to claim 42, wherein said second deflection means comprises a vibrating mirror.

52. An apparatus according to claim 42, wherein said second deflection means comprises a rotating polygonal mirror.

53. An apparatus according to claim 42, wherein said first lens means collects a light flux reflected by the specimen and the apparatus further comprises an optical system for directing the light beam emanating from the objective leans and deflected by said second deflection means onto the linear image sensor.

54. An apparatus according to claim 52, wherein said optical system comprises a half mirror arranged between the first and second deflection means.

55. An apparatus according to claim 42, further comprising a focus detection means for detecting a focus condition of the first lens means by receiving a part of the light beam directed to the linear image sensor.

56. An apparatus according to claim 42, wherein said light source unit comprises red, green and blue light sources for emitting red, green and blue light beams and said light detector unit comprises three linear image sensors for receiving red, green and blue light beams, respectively, and the apparatus further comprising an optical system for introducing the red, green and blue light beams into a common optical path arranged between the first and second deflecting means.

57. An apparatus according to claim 56, wherein said optical system comprises first and second dichroic mirrors arranged in an optical path of one light beam.

58. An apparatus according to claim 56, further comprising a focus detection device for detecting a focus condition of the first lens means by means of a part of one light beam directed toward one linear image sensor.

59. An apparatus according to claim 56, wherein said optical system comprises at least two concave lenses arranged movably along optical paths of at least two light beams for adjusting size of raster images projected onto the linear image sensors related to said at least two light beams.

60. An apparatus according to claim 56, further comprising at least two said third deflection means for deflecting at least two light beams in the sub-scanning direction in synchronism with the second deflection means such that any deviation of the raster in the sub-scanning direction can be compensated for.

61. An apparatus according to claim 60, wherein said third deflection means is driven linearly.

62. An apparatus according to claim 60, wherein said third deflection means is driven non-linearly.

63. An apparatus according to claim 60, wherein said third deflection means comprises a vibrating means.

64. An apparatus according to claim 60, wherein said third deflection means comprises a plan parallel plate arranged rotatably about a shaft extending in the main-scanning direction.

65. An apparatus according to claim 56, wherein at least two readout frequencies of at least two linar image sensors are adjustable such that any deviation in the main-scanning direction between red, green and blue rasters can be compensated for.

66. An apparatus according to claim 56, wherein said means for reading out comprises three memories for storing image signals readout of the three linear image sensors, respectively a write-in control circuit for controlling write-in operation at the three memories, and a readout control circuit for controlling reading out operation at the three memories.

67. An apparatus according to claim 56, wherein readout frequencies of at least two memories are adjustable such that any deviation in the main-scanning direction between red, green and blue rasters can be compensated for.

68. An apparatus according to claim 67, wherein said readout frequency is changed linearly.

69. An apparatus according to claim 67, wherein said readout frequency is changed non-linearly.

70. An apparatus according to claim 66, wherein a readout frequency of at least one memory is adjusted such that any deviation of a raster in the sub-scanning direction can be compensated for.

71. An apparatus according to claim 42, further comprising a stage for supporting the specimen, means for moving the stage relative to the lens in its optical axis direction, and a signal processing circuit including a frame memory for storing the image signal readout of the linear image sensor.

72. An apparatus according to claim 71, wherein said signal processing circuit derives a sum of the image signals readout of respective photoelectric converting elements of the linear image sensor.

73. An apparatus according to claim 71, wherein the stage is moved at a constant speed.

74. An apparatus according to claim 71, wherein the stage is moved at a varying speed.

75. An apparatus according to claim 42, wherein said second deflection means is arranged immediatey after said first deflection means.

76. An apparatus according to claim 42, wherein both said first deflecting means and said second deflecting means comprise an expander for expanding the light beam emitted from the light source, a cylindrical lens for converging the expanded light beam only in the sub-scanning direction to form a rectilinear light beam, a vibrating mirror for deflecting the converged light beam in the sub-scanning direction, and a lens for focusing the deflected light beam on the specimen as a rectilinear light spot.

77. An apparatus according to claim 76, wherein said light source unit comprises red, green and blue light sources emitting red, green and blue light beams, respectively, and both said first deflecting means and said second deflecting means comprise three pairs of expander and cylindrical lens, each being arranged in respectively red, green and blue optical paths, an optical system for introducing the red, green and blue light beams into a common optical path, and a single vibrating mirror arranged to receive the red, green and blue light beams propagating along the common optical path and to deflect the red, green and blue light beams in the sub-scanning direction.

78. An apparatus according to claim 54, wherein said optical system comprises a polarization element and a quarter wavelength plate arranged between said first deflecting means and said second deflecting means.

79. An apparatus according to claim 55, further comprising an objective lens for collecting a light flux transmitted through the specimen, a third deflecting means for deflecting a light beam emanating from the objective lens in the sub-scanning direction in synchronism with the second deflection means, and an optical system for directing the light beam deflected by the third deflecting means onto the linear image sensor.

80. An apparatus according to claim 79, wherein said second deflecting means and said third deflecting means comprise reflection surfaces formed on front and rear surfaces of a plate which is swung about a shaft extending in the sub-scanning direction.

81. An apparatus according to claim 80, wherein said plate assumes first and second positions perpendicular to each other, and the apparatus further comprises an optical path switching element which assumes first and second positions, when the plate and optical path switching element are in the first positions, the light beam deflected by said first deflecting means and said second deflecting means is projected onto the specimen and a light flux reflected by the specimen which is collected by the objective lens is projected onto the linear image sensor via the second deflecting means and optical path switching element to effect a reflection type inspection, and when said plate and optical path switching element are in the second positions, the light beam deflected by said first deflecting means and said second deflecting means is projected upon the specimen by means of a condenser lens and a light flux transmitted through the specimen is collected by the objective lens and is projected onto said linear image sensor via the third deflecting means an doptical path switching element to effect a transmission type inspection.

82. An apparatus according to claim 81, further comprising an optical system for reversing right and left arranged in an optical path between the plate and condenser lens.

* * * * *